(12) United States Patent
Kim et al.

(10) Patent No.: US 10,471,956 B2
(45) Date of Patent: Nov. 12, 2019

(54) VEHICLE CONTROL METHOD THEREOF

(71) Applicant: LG Electronics Inc., Seoul (KR)

(72) Inventors: Cheolmun Kim, Seoul (KR); Sanghyuk Lee, Seoul (KR); Jonghwa Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 63 days.

(21) Appl. No.: 15/802,878

(22) Filed: Nov. 3, 2017

(65) Prior Publication Data
US 2018/0126986 A1    May 10, 2018

(30) Foreign Application Priority Data
Nov. 7, 2016  (KR) .................. 10-2016-0147224

(51) Int. Cl.
| | | |
|---|---|---|
| *G06F 17/10* | (2006.01) | |
| *B60W 30/095* | (2012.01) | |
| *B60W 30/09* | (2012.01) | |
| *B60W 40/04* | (2006.01) | |
| *B60W 40/09* | (2012.01) | |

(Continued)

(52) U.S. Cl.
CPC .......... *B60W 30/095* (2013.01); *B60W 30/09* (2013.01); *B60W 40/04* (2013.01); *B60W 40/09* (2013.01); *G05D 1/0214* (2013.01); *B60W 2040/0818* (2013.01); *B60W 2050/0071* (2013.01); *B60W 2420/403* (2013.01);

(Continued)

(58) Field of Classification Search
CPC .... B60W 30/16; B60W 30/095; B60W 30/09; B60W 40/04; B60W 40/09; B60W 40/08; G05D 1/0214

USPC .................................... 701/301, 41
See application file for complete search history.

(56) References Cited

U.S. PATENT DOCUMENTS

| | | | | |
|---|---|---|---|---|
| 2013/0226408 | A1* | 8/2013 | Fung ..................... | B60W 40/09 701/41 |
| 2018/0057002 | A1* | 3/2018 | Lee ....................... | B60W 30/16 |
| 2018/0079447 | A1* | 3/2018 | Yamashita ........... | B62D 5/0469 |

FOREIGN PATENT DOCUMENTS

| | | |
|---|---|---|
| DE | 102011089938 A1 | 6/2013 |
| DE | 102015204284 A1 | 9/2016 |

(Continued)

OTHER PUBLICATIONS

Extended European Search Report in European Application No. 17001808.9, dated Feb. 16, 2018, 8 pages.

Primary Examiner — Mahmoud S Ismail
(74) Attorney, Agent, or Firm — Fish & Richardson P.C.

(57) ABSTRACT

A vehicle that includes: an input device that is configured to receive a user command from a user; and a controller that is configured to: obtain vehicle driving information, based on the vehicle driving information, control the vehicle to travel autonomously, determine whether the user command is inconsistent with the vehicle driving information, based on a determination that the user command is inconsistent with the vehicle driving information, determine to ignore the user command, in response to a determination to ignore the user command, control the vehicle based on the vehicle driving information without the user command, based on a determination that the user command is consistent with the vehicle driving information, determine to apply the user command, and in response to a determination to apply the user command, control the vehicle based on the vehicle driving information and the user command is disclosed.

20 Claims, 25 Drawing Sheets

(51) Int. Cl.
  *G05D 1/02*    (2006.01)
  *A01B 69/00*    (2006.01)
  *B62D 6/00*    (2006.01)
  *B62D 11/00*    (2006.01)
  *B62D 12/00*    (2006.01)
  *B63G 8/20*    (2006.01)
  *B63H 25/04*    (2006.01)
  *G05D 1/00*    (2006.01)
  *G06F 7/00*    (2006.01)
  *G06F 19/00*    (2018.01)
  *B60W 50/00*    (2006.01)
  *B60W 40/08*    (2012.01)

(52) U.S. Cl.
  CPC ..... *B60W 2420/42* (2013.01); *B60W 2420/52* (2013.01); *B60W 2422/00* (2013.01)

(56) References Cited

FOREIGN PATENT DOCUMENTS

| | | |
|---|---|---|
| JP | 2002333922 A1 | 11/2002 |
| JP | 2004243787 A1 | 9/2004 |
| JP | 2005250564 A1 | 9/2005 |
| JP | 2009078735 A1 | 4/2009 |
| JP | 2011131838 A1 | 7/2011 |
| JP | 2012234312 A1 | 11/2012 |
| JP | 2016064773 A1 | 4/2016 |
| JP | 2016175614 A1 | 10/2016 |
| KR | 20160089285 A1 | 7/2016 |
| WO | WO201015990 A1 | 1/2014 |
| WO | WO2015200224 A1 | 12/2015 |
| WO | WO-2015200224 A2 * 12/2015 ............ B60W 40/08 |

* cited by examiner (a)

(b)

(a)

(b)

(a)  (b)

(a)

(b)

VEHICLE CONTROL METHOD THEREOF

CROSS-REFERENCE TO RELATED APPLICATION

This application claims the priority benefit of Korean Patent Application No. 10-2016-0147224, filed on Nov. 7, 2016 in the Korean Intellectual Property Office, the content of which is incorporated by reference herein in its entirety.

TECHNICAL FIELD

The present application generally relates to a vehicle and a control method thereof.

BACKGROUND

A vehicle is an apparatus that moves in a direction desired by a user riding therein. A representative example of a vehicle may be an automobile.

In some implementations, a variety of sensors and electronic devices have been mounted in vehicles for the convenience of a user who uses the vehicle. In particular, for user driving convenience, an Advanced Driver Assistance System (ADAS) has been actively studied. In addition, enormous efforts have been being made to develop autonomous vehicles.

If a user applies a command through a handle or an accelerator pedal when a vehicle is travelling autonomously, the vehicle basically ignores the user command and keeps travelling autonomously.

However, it is sometimes necessary to apply a user's command even when the vehicle is travelling autonomously. In addition, if the user fails to perceive a dangerous situation, which is recognized by the vehicle, and inputs a wrong command, it is safe that the vehicle ignores the user's command and keeps travelling autonomously.

For these reasons, there are ongoing efforts to study a technology that applies a user command, which is received during autonomous travelling of a vehicle, only when the user command is suitable for a driving situation of the vehicle.

SUMMARY

In general, one innovative aspect of the subject matter described in this specification can be implemented in a vehicle comprising: an input device that is configured to receive a user command from a user; and a controller that is configured to: obtain vehicle driving information, based on the vehicle driving information, control the vehicle to travel autonomously, determine whether the user command is inconsistent with the vehicle driving information, based on a determination that the user command is inconsistent with the vehicle driving information, determine to ignore the user command, in response to a determination to ignore the user command, control the vehicle based on the vehicle driving information without the user command, based on a determination that the user command is consistent with the vehicle driving information, determine to apply the user command, and in response to a determination to apply the user command, control the vehicle based on the vehicle driving information and the user command.

The foregoing and other implementations can each optionally include one or more of the following features, alone or in combination. In particular, one implementation includes all the following features in combination. The controller is configured to: determine whether driving the vehicle based on the user command (i) increases a probability of collision with an object outside the vehicle, (ii) increases impact impulse of a collision with an object, (iii) results in violation of a traffic regulation, or (iv) renders the vehicle out of control, based on a determination that driving the vehicle based on the user command (i) increases a probability of collision with an object outside the vehicle, (ii) increases impact impulse of a collision with an object, (iii) results in violation of a traffic regulation, or (iv) renders the vehicle out of control, determine that the user command is inconsistent with the vehicle driving information. The controller is configured to: receive the user command, calculate a control limit corresponding to the user command based on the vehicle driving information, and control the vehicle based on the vehicle driving information, the user command, and the control limit. The vehicle further includes: an occupant sensing unit that is configured to monitor driver state and provide driver state information, wherein the controller is configured to: based on the driver state information, determine whether the user command is not intended by a driver of the vehicle, and based on a determination that the user command is not intended by the driver of the vehicle, determine to ignore the user command. The input device includes: a driving manipulation device that is configured to receive the user command, the user command including at least one user command from a plurality of user commands including a user command for steering, a user command for acceleration, and a user command for deceleration, and wherein the controller is configured to determine whether to apply the at least one user command individually. The controller is configured to: based on a determination to apply the at least one user command that is a user command for steering, control the vehicle to (i) perform lane change maneuver, (ii) make a left-turn, or (iii) make a right-turn using the user command and the vehicle driving information. The controller is configured to: based on a determination to apply the at least one user command that is a user command for acceleration, increase a speed of the vehicle by a preset amount of acceleration, and based on a determination to apply the at least one user command that is a user command for deceleration, decrease a speed of the vehicle by a preset amount of deceleration. The controller is configured to: in a state in which the driving manipulation device receives the user command including the user command for steering, calculate a steering control limit corresponding to the user command, and control the vehicle based on the vehicle driving information, the user command, and the steering control limit. The driving manipulation device includes: a steering wheel that is configured to receive the user command for steering, and wherein the controller is configured to: based on the steering control limit, block the steering wheel from turning more than a first angle. The controller is configured to: in a state in which the driving manipulation device receives the user command including the user command for acceleration, calculate an acceleration control limit corresponding to the user command for acceleration, control the vehicle based on the vehicle driving information, the user command, and the acceleration control limit, in a state in which the driving manipulation device receives the user command including the user command for deceleration, calculate a deceleration control limit corresponding to the user command for deceleration, and control the vehicle based on the vehicle driving information, the user command, and the deceleration control limit. The driving manipulation device includes: an accelerator pedal that is configured to receive the user command for acceleration, and a brake pedal that is configured to receive the user command for deceleration, and wherein the controller is configured to: based on the acceleration control limit, block the accelerator pedal from being pressed more than a first depth, and based on the deceleration control limit, block the brake pedal from being pressed more than a second depth. The controller is configured to: in a state in which the user command is inconsistent with the vehicle driving information, determine a first location at which the user command is applicable, and move the vehicle to the first location, and control the vehicle based on the user command and the vehicle driving information. The controller is configured to: in a state in which the input device receives the user command including a user command for lane change, determine, based on the vehicle driving information, whether the user command for changing lanes is applicable, in a state in which the user command for changing lanes is not applicable, determine a second location at which the user command for changing lanes is applicable, move the vehicle to the second location, and based on the user command and the vehicle driving information, control the vehicle to change lanes. The controller is configured to: in a state in which the input device receives the user command including the user command for acceleration, determine, based on the vehicle driving information, whether the user command for acceleration is applicable, in a state in which the user command for acceleration is not applicable, determine a third location at which the user command for acceleration is applicable, move the vehicle to the third location, and based on the user command for acceleration and the vehicle driving information, control the vehicle to accelerate. The controller is configured to: in a state in which the input device receives the user command including a user command for deceleration, determine, based on the vehicle driving information, whether user command for deceleration is applicable, in a state in which the user command for deceleration is not applicable, determine a fourth location at which the user command for deceleration is applicable, move the vehicle to the fourth location, and based on the user command for deceleration and the vehicle driving information, control the vehicle to decelerate. The controller is configured to: in a state in which the vehicle is travelling at an autonomous driving mode, determine whether the input device receives the user command including a user command switching to a manual driving mode, based on a determination that the input device receives the user command switching to the manual driving mode, determine a fifth location at which the manual driving mode is available, and move the vehicle to the fifth location. The vehicle further includes: an output unit, wherein the controller is configured to: in a state in which the user command is inconsistent with the vehicle driving information, provide, to the output unit, (i) a notification indicating that the user command is not applicable and (ii) a menu to receive a confirmation, from the user, as to whether the user intends to move the vehicle to the first location at which the user command is applicable, and (i) in response to the confirmation that the user intends to move the vehicle to the first location or (ii) in a state in which the input device receives two or more user commands that are inconsistent with the vehicle driving information for a first time period, move the vehicle to the first location. The controller is configured to: in a state in which the input device receives two or more user commands that are inconsistent with the vehicle driving information for a second time period, control the vehicle to perform a preset operation associated with the user command. The controller is configured to: determine whether the input device receives two or more user commands for deceleration for the second time period, the two or more user commands for deceleration being inconsistent with the vehicle driving information, and based on a determination that the input device receives the two or more user commands for deceleration for the second time period, control the vehicle to perform preset emergency stop. The controller is configured to: determine whether the input device receives two or more user commands for acceleration for the second time period, the two or more user commands for acceleration being inconsistent with the vehicle driving information, and based on a determination that the input device receives the two or more user commands for acceleration for the second time period, control the vehicle to operate at a preset acceleration mode.

In general, another innovative aspect of the subject matter described in this specification can be implemented in a method of controlling a vehicle at an autonomous driving mode of the vehicle, the method comprising: receiving one or more user commands including a user command for steering, a user command for acceleration, and a user command for deceleration; determining whether each of the one or more user commands is inconsistent with vehicle driving information; in response to determining whether each of the one or more user commands is inconsistent with the vehicle driving information, obtaining at least one user command from the one or more user commands, the at least one user command being consistent with the vehicle driving information; controlling the vehicle based on the at least one user command and the vehicle driving information; in a state in which the vehicle is controlled based on the at least one user command and the vehicle driving information, determine whether the at least one user command is changed such that the at least one user command is inconsistent with the vehicle driving information; and based on a determination that the at least one user command is changed such that the at least one user command is inconsistent with the vehicle driving information, controlling the vehicle based on the vehicle driving information without the at least one user command.

The subject matter described in this specification can be implemented in particular examples so as to realize one or more of the following advantages. Comparing to a conventional vehicle, a vehicle determines whether a user command received during travelling of the vehicle is suitable for a driving situation of the vehicle. In particular, the vehicle uses a user command that is suitable for a driving situation of a vehicle so that the vehicle can prevent a risk caused by a wrong decision made by a user. In addition, at a state in which a user command is not available, the vehicle moves to a location at which the user command is available so that the vehicle can travel autonomously by reflecting a user's intention.

The details of one or more examples of the subject matter described in this specification are set forth in the accompanying drawings and the description below. Other potential features, aspects, and advantages of the subject matter will become apparent from the description, the drawings, and the claim.

BRIEF DESCRIPTION OF THE DRAWINGS

Like reference numbers and designations in the various drawings indicate like elements.

DETAILED DESCRIPTION

A vehicle as described in this specification can include an automobile and a motorcycle. A vehicle as described in this specification may include all of an internal combustion engine vehicle including an engine as a power source, a hybrid vehicle including both an engine and an electric motor as a power source, and an electric vehicle including an electric motor as a power source.

Figure 1:
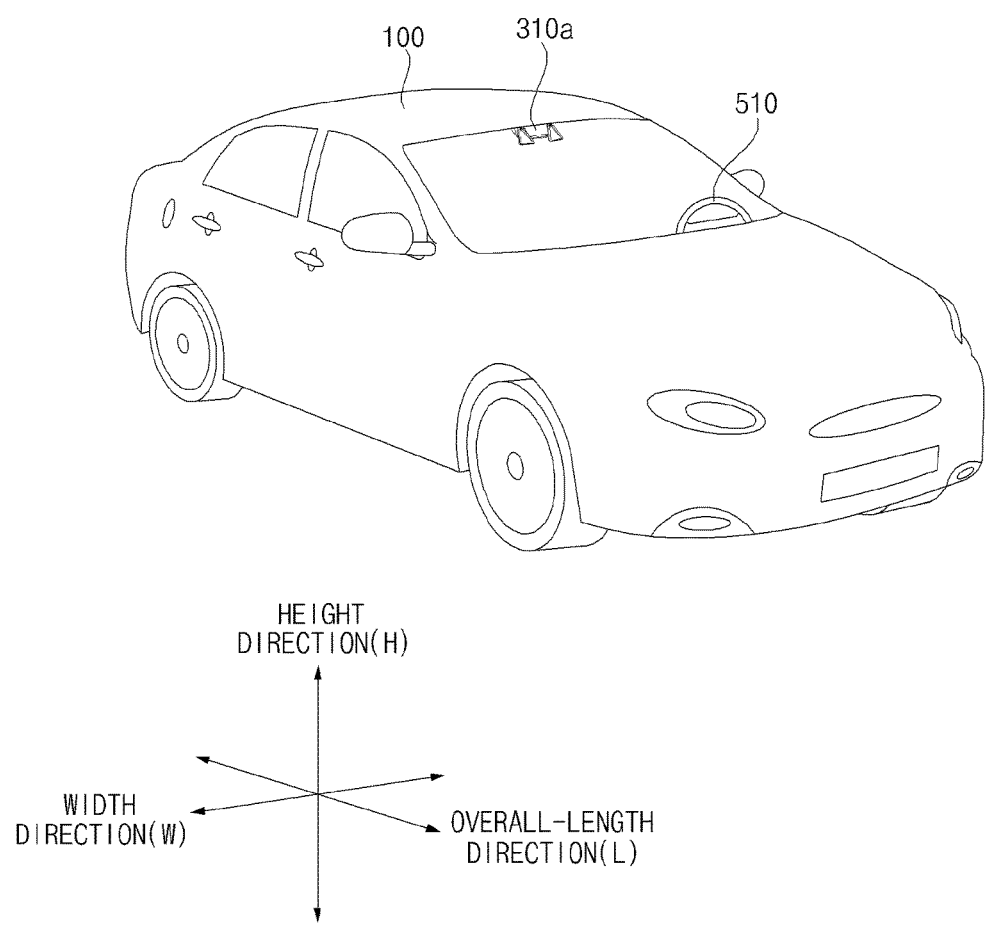
FIG. 1 is a diagram illustrating an example vehicle.
Figure 2:
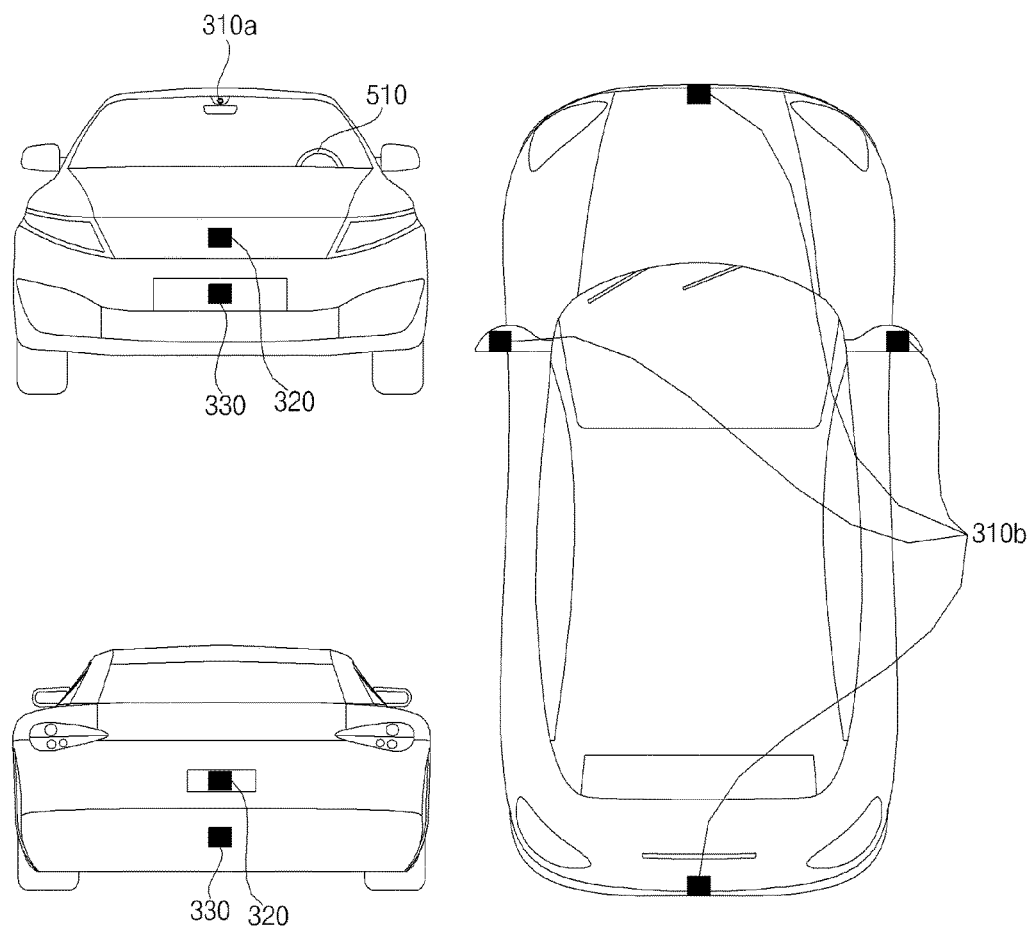
FIG. 2 is a diagram illustrating an example exterior of a vehicle.
Figure 3:
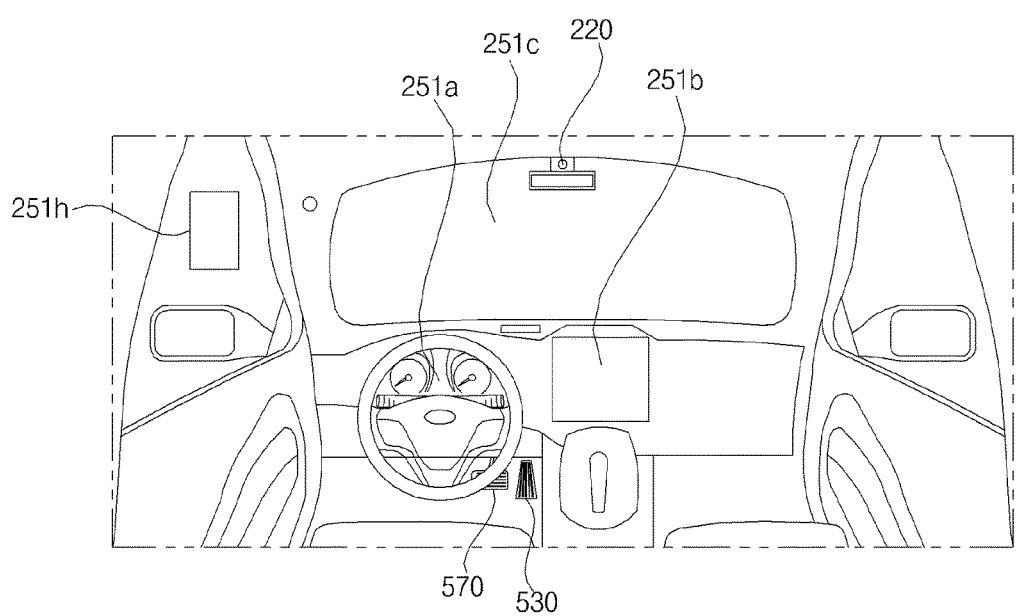
FIGS. 3 and 4 are diagrams illustrating an example interior of a vehicle.
Figure 4:
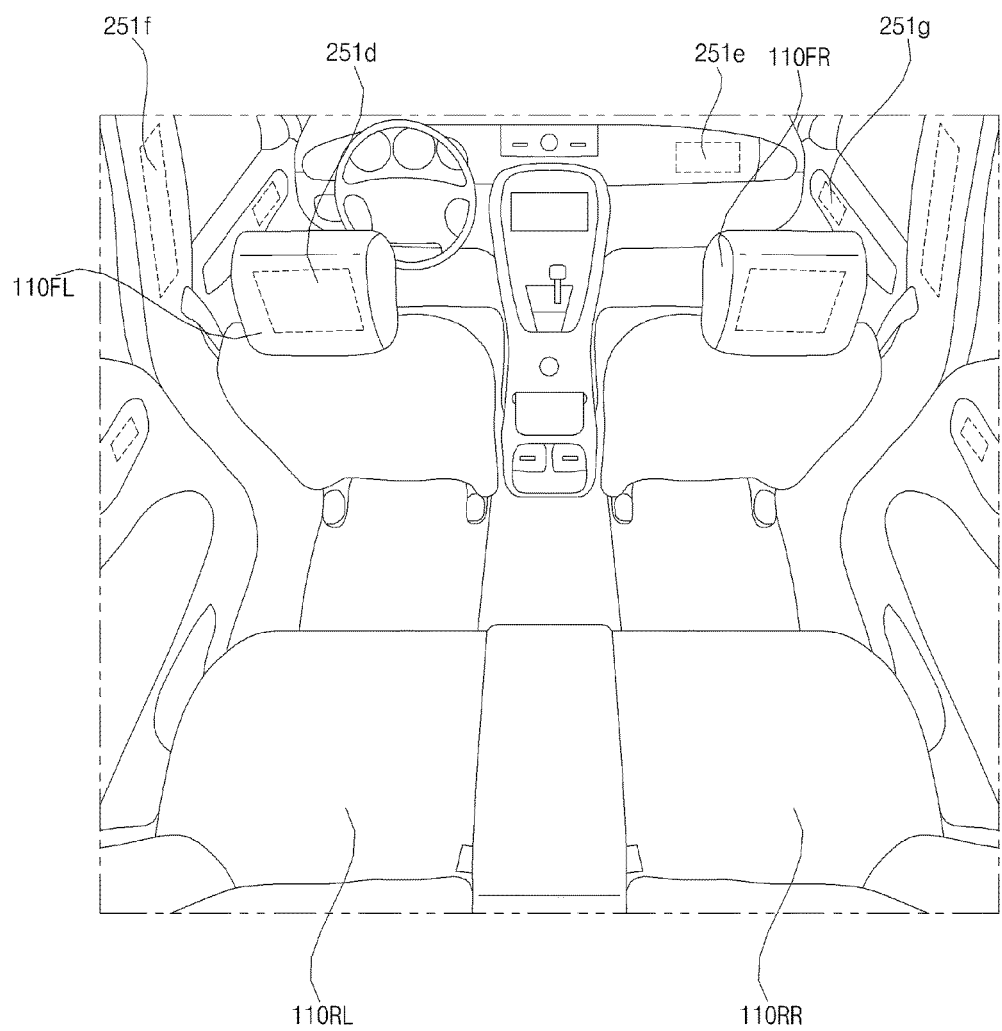
Figure 5:
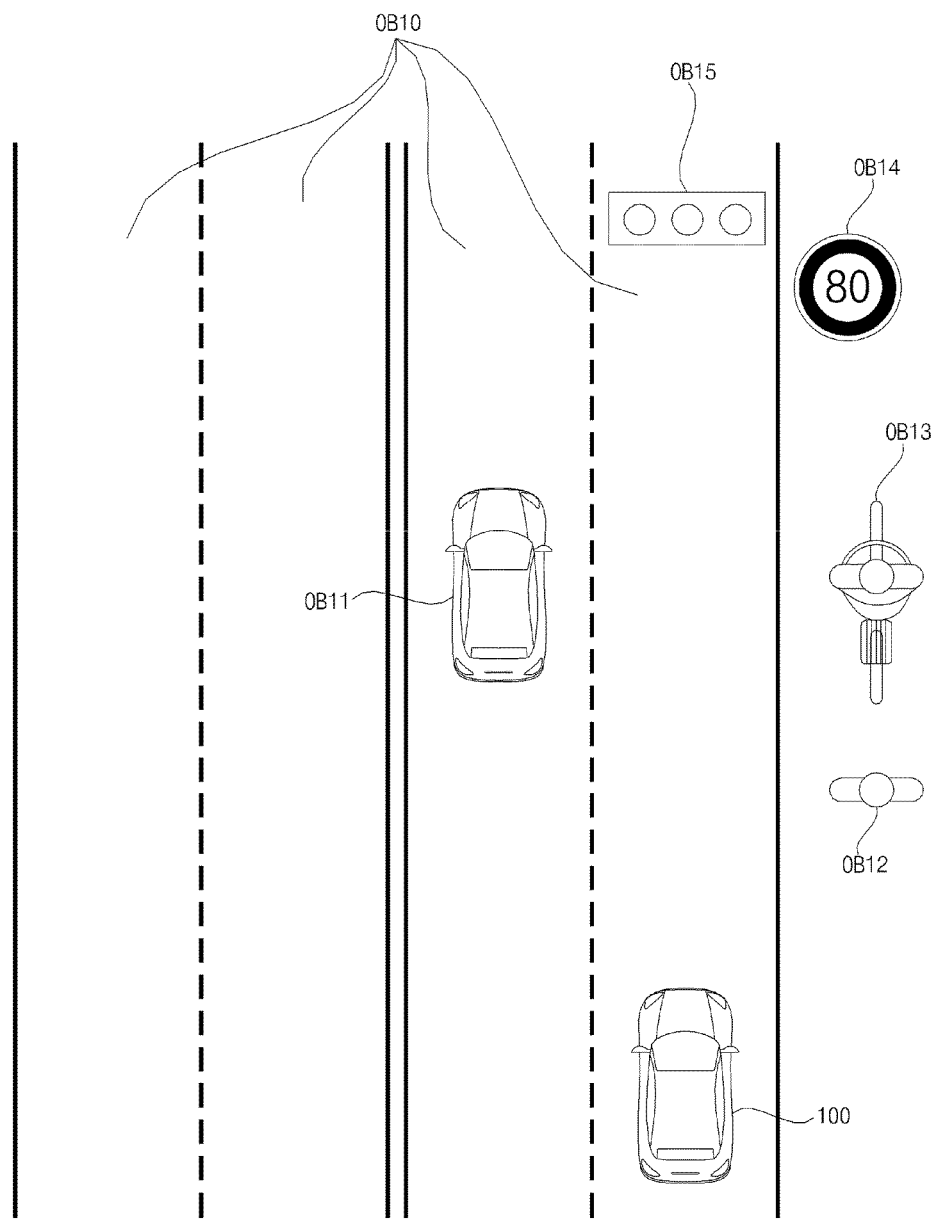
FIGS. 5 and 6 are diagrams illustrating one or more example objects outside a vehicle.
Figure 6:
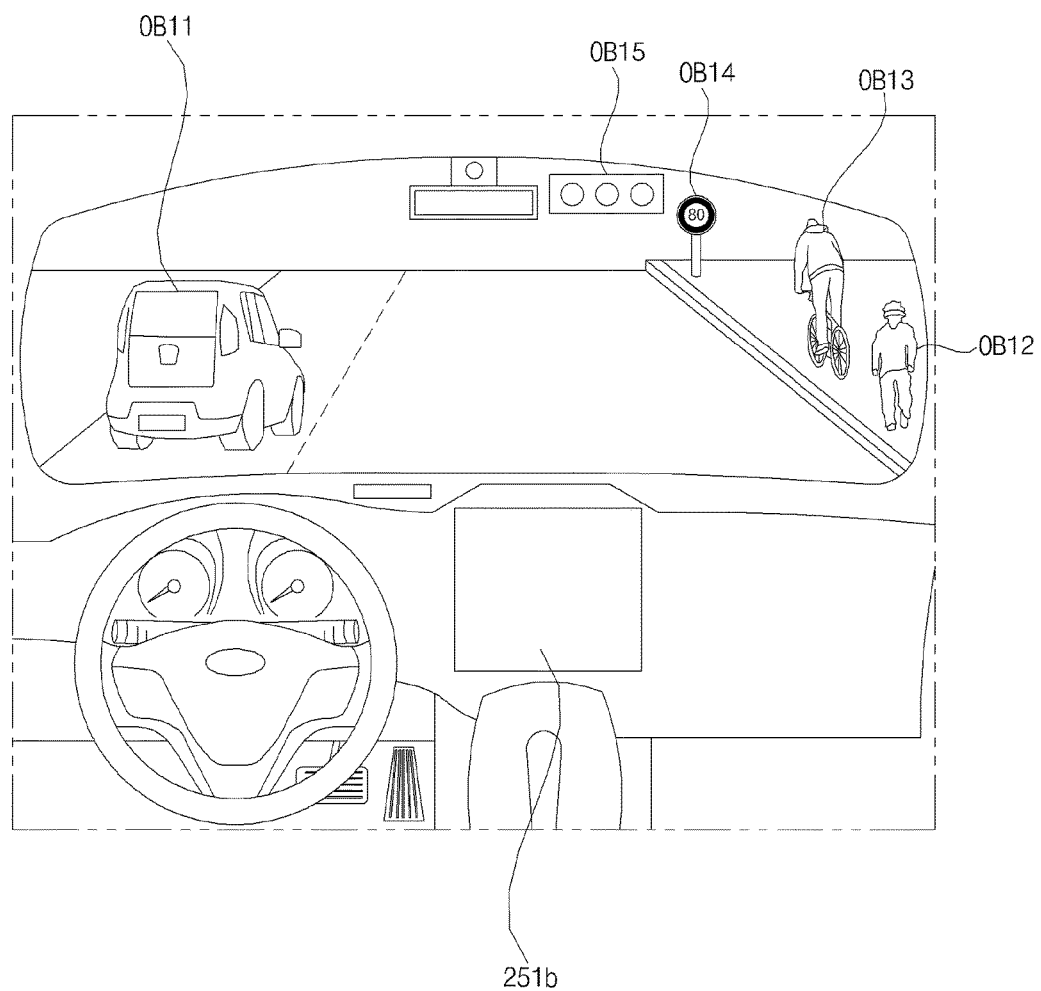
Figure 7:
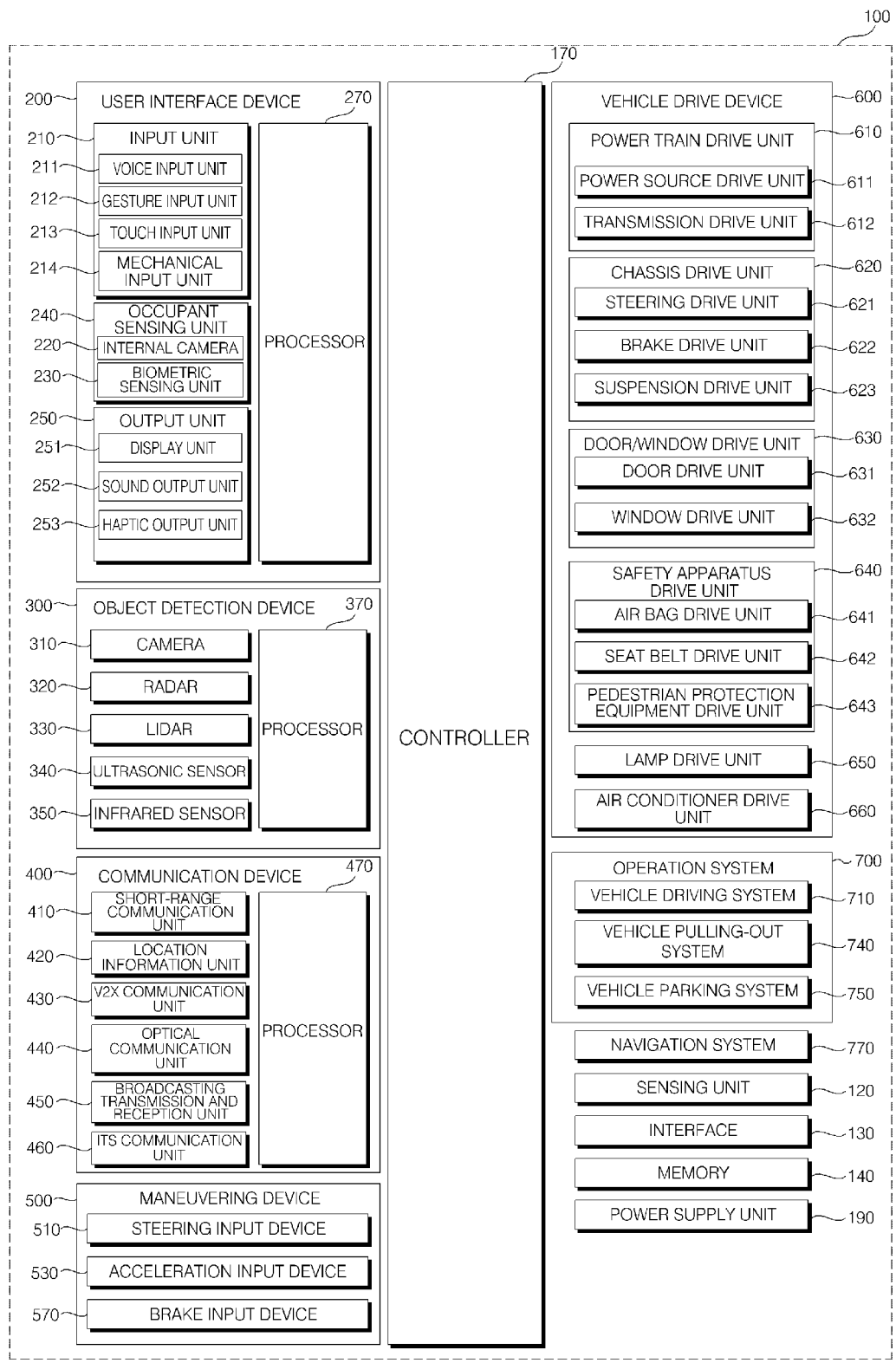
FIG. 7 is a diagram illustrating an example vehicle.

FIG. 1 illustrates an example vehicle. FIG. 2 illustrates an example exterior of a vehicle. FIGS. 3 and 4 illustrate an example interior of a vehicle. FIGS. 5 and 6 illustrate one or more example objects outside a vehicle. FIG. 7 illustrates an example vehicle.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle.

The vehicle 100 may travel autonomously under the control of the controller 170.

The vehicle 100 may travel autonomously based on vehicle driving information.

The vehicle driving information may be information that is acquired by various units during travelling of the vehicle 100.

The vehicle driving information may include at least one of the following: information on an object outside the vehicle, which is acquired by the object detection device; information received using the communication device 400 while the vehicle 100 travels; navigation information; control status information of the vehicle 100, and location information of the vehicle 100. For example, the vehicle driving information may include information on a different vehicle, which is transmitted by the different vehicle, information on a route of the vehicle 100, and map information.

For example, the vehicle driving information may indicate: a type, location, movement of an object located around the vehicle 100; whether a traffic line exists in the vicinity of the vehicle 100; whether any nearby vehicle is travelling while the vehicle 100 is stopped; whether there is a space in the vicinity of the vehicle 100 to stop; whether a vehicle and an object could collide; where a pedestrian or a bicycle is located with reference to the vehicle 100; a type of a roadway in which the vehicle 100 is travelling, a status of a traffic light in the vicinity of the vehicle 100, and movement of the vehicle 100.

The vehicle driving information may be acquired by at least one of an object detection device 300, a communication device 400, a navigation system 770, a sensing unit 120, and an interface 130, and provided to a controller 170. Based on the vehicle driving information, the controller 170 may control the vehicle 100 to travel autonomously.

A control mode of the vehicle 100 may be a mode indicating of which subject controls the vehicle 100. For example, the control mode of the vehicle 100 may include: an autonomous vehicle in which the control unit 170 or the operation system included in the vehicle controls the vehicle 100; a manual driving mode in which a driver in the vehicle 100 controls the vehicle 100; and a remote control mode in which a device other than the vehicle 100 controls the vehicle 100.

When the vehicle 100 is in the autonomous mode, the controller 170 or the operation system 700 may control the vehicle 100 based on vehicle driving information. Accordingly, the vehicle 100 may travel without a user command received using the driving manipulation device 500. For example, the vehicle 100 in the autonomous mode may travel based on information, data, or a signal that is generated in a driving system 710, a parking-out system 740, and a parking system 750.

If a user command is received using the driving manipulation device 500 while the vehicle 100 travels autonomously, the vehicle may determine whether the user command is inconsistent with acquired vehicle driving information.

If the user command is inconsistent with the vehicle driving information, the vehicle 100 may ignore the user command. If the user command is consistent with the vehicle driving information, the vehicle 100 may apply the user command.

If the vehicle 100 applies the user command, the vehicle 100 may travel based on the user command and the vehicle driving information. If the vehicle 100 ignores the user command, the vehicle 100 may travel based solely on the vehicle driving information. Detailed description thereof will be provided with reference to FIG. 8 and other following drawings.

When the vehicle 100 in the manual driving mode, the vehicle 100 may be controlled by a user command received using the driving manipulation device 500, the user command which is with regard to at least one of steering, acceleration, and deceleration. In this case, the driving manipulation device 500 generates an input signal corresponding to the user command, and provide the generated input signal to the controller 170. The controller may control the vehicle based on the input signal provided by the driving manipulation device 500.

When the vehicle 100 in the remote control mode, a device other than the vehicle 100 may control the vehicle

100. If the vehicle 100 operates in the remote control mode, the vehicle 100 may receive a remote control signal, transmitted by a different vehicle, via the communication device 400. The vehicle 100 may be controlled based on the remote control signal.

Based on a user input received using the user interface device 200, the vehicle 100 may enter one of the autonomous mode, the manual driving mode, and the remote control mode. A control mode of the vehicle may be switched to one of the autonomous mode, the manual driving mode, and the remote control mode based on at least one of driver state information, vehicle driving information, and vehicle state information.

The driver state information may be generated based on an image or biometric information of a driver detected by an internal camera 220 or a biometric sensor 230. For example, the driver state information may be information that is generated based on an image, acquired by the internal camera 220, about an eye gaze, a face, a behavior, a facial expression, and a location of the driver. For example, the driver state information may be information generated based on biometric information of a user acquired by the biometric sensing unit 230.

For example, the driver state information may indicate a direction in which a gaze of the driver is directed, whether the driver is dozing off, a health condition of the driver, and an emotional condition of the driver.

The driver state information may be generated through the user interface device 200, and provided to the controller 170.

The vehicle state information may be information about the states of various units provided in the vehicle 100. For example, the vehicle state information may include information about the operational states of the user interface device 200, the object detection device 300, the communication device 400, the driving manipulation device 500, the vehicle drive device 600, and the operation system 700, and information about an error of each unit.

For example, the vehicle state information may indicate: whether a GPS signal of the vehicle 100 is received normally; whether an error has occurred in at least one sensor provided in the vehicle 100, and whether each device provided in the vehicle 100 operates normally.

For example, the control mode of the vehicle 100 may be switched from a manual driving mode to an autonomous mode, or vice versa, based on object information generated by the object detection device 300.

For example, the control mode of the vehicle 100 may be switched from a manual driving mode to an autonomous mode, or vice versa, based on information received using the communication device 400.

In some implementations, the term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

As illustrated in FIG. 7, the vehicle 100 may include the user interface device 200, the object detection device 300, the communication device 400, the maneuvering device 500, a vehicle drive device 600, the operation system 700, a navigation system 770, a sensing unit 120, an interface 130, a memory 140, a controller 170, and a power supply unit 190.

The user interface device 200 or the driving manipulation device 500 is a device capable of receiving a user command, and may be called an input device.

In some implementations, the vehicle 100 may further include other components in addition to the aforementioned components, or may not include some of the aforementioned components.

The user interface device 200 is provided to support communication between the vehicle 100 and a user. The user interface device 200 may receive a user input, and provide information generated in the vehicle 100 to the user. The vehicle 100 may enable User Interfaces (UI) or User Experience (UX) through the user interface device 200.

The user interface device 200 may include an input unit 210, an internal camera 220, a biometric sensing unit 230, an output unit 250, and a processor 270.

In some implementations, the user interface device 200 may further include other components in addition to the aforementioned components, or may not include some of the aforementioned components.

The input unit 210 is configured to receive a user command from a user, and data collected in the input unit 210 may be analyzed by the processor 270 and then recognized as a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some implementations, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some implementations, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

An occupant sensing unit 240 may detect an occupant in the vehicle 100. The occupant sensing unit 240 may include the internal camera 220 and the biometric sensing unit 230.

The internal camera 220 may acquire images of the inside of the vehicle 100. The processor 270 may sense a user's state based on the images of the inside of the vehicle 100. For example, a user's detected condition may be about an eye gaze, a face, a behavior, a facial expression, and a location of the user.

The processor 270 may acquire information on the eye gaze, the face, the behavior, the facial expression, and the location of the user from an image of the inside of the vehicle 100. The processor 270 may sense a gesture of the user from the image of the inside of the vehicle 100. The information acquired by the processor 270 from the image of the inside of the vehicle 100 may be driver state information. In this case, the driver state information may indicate a direction in which a gaze of the driver is directed, and a behavior, facial expression, and gesture of the driver. The processor 270 may provide the driver state information, which is acquired from the image of the inside of the vehicle 100, to the controller 170, The biometric sensing unit 230 may acquire biometric information of the user. The biometric sensing unit 230 may include a sensor for acquire biometric information of the user, and may utilize the sensor to acquire finger print information, heart rate information, brain wave information etc. of the user. The biometric information may be used to authenticate a user or determine the user's condition.

The processor 270 may determine a driver's state based on the driver's biometric information. Information acquired by the processor 270 through determining the driver's condition may be driver state information. In this case, the driver state information may indicate whether the driver is in faint, dozing off, excited, or in an emergency situation. The processor 270 may provide the driver state information, acquired based on the driver's biometric information, to the controller 170.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In some implementations, the user interface device 200 may include a plurality of display units 251a to 251g.

The display unit 251 may be disposed in a region 251a of a steering wheel, a region 251b or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface device 200.

In some implementations, the user interface device 200 may include a plurality of processors 270 or may not include the processor 270.

In a case where the user interface device 200 does not include the processor 270, the user interface device 200 may operate under control of the controller 170 or a processor of a different device inside the vehicle 100.

In some implementations, the user interface device 200 may be referred to as a display device for vehicle.

The user interface device 200 may operate under control of the controller 170.

The object detection device 300 is configured to detect an object outside the vehicle 100.

The object may include various objects related to travelling of the vehicle 100.

Referring to FIGS. 5 and 6, an object o may include a lane OB10, a nearby vehicle OB11, a pedestrian OB12, a two-wheeled vehicle OB13, a traffic sign OB14 and OB15, a light, a road, a structure, a bump, a geographical feature, an animal, etc.

The lane OB10 may be a lane in which the vehicle 100 is traveling, a lane next to the lane in which the vehicle 100 is traveling, or a lane in which a different vehicle is travelling from the opposite direction. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is travelling ahead or behind the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway. The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic sign may include a traffic light OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a bridge, a traffic light, a curb, a guardrail, etc.

The geographical feature may include a mountain and a hill.

In some implementations, the object may be classified as a movable object or a stationary object. For example, the movable object may include a nearby vehicle and a pedestrian. For example, the stationary object may include a traffic sign, a road, a structure, and a traffic line.

The object detection device 300 may include a camera 310, a radar 320, a lidar 330, an ultrasonic sensor 340, an infrared sensor 350, and a processor 370.

In some implementations, the object detection device 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310*a*, an Around View Monitoring (AVM) camera 310*b*, or a 360-degree camera.

For example, the camera 310 may be disposed near a front windshield in the vehicle 100 in order to acquire images of the front of the vehicle 100. Alternatively, the camera 310 may be disposed around a front bumper or a radiator grill. In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar.

When implemented as the drive type lidar, the lidar 300 may rotate by a motor and detect an object in the vicinity of the vehicle 100.

When implemented as the non-drive type lidar, the lidar 300 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection device 300.

The processor 370 may detect and track an object based on acquired images. The processor 370 may, for example, calculate the distance to the object and the speed relative to the object, determine a type, location, size, shape, color, moving path of the object, and determine a sensed text.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

The processor may generate object information based on at least one of the following: an information acquired using the camera 310, a reflected electronic wave received using the radar 320, a reflected laser light received using the lidar 330, and a reflected ultrasonic wave received using the ultrasonic sensor 340, and a reflected infrared light received using the infrared sensor 350.

The object information may be information about a type, location, size, shape, color, a moving path, and speed of an object existing around the vehicle 100 and information about a sensed text.

For example, the object information may indicate: whether a traffic line exists in the vicinity of the vehicle 100; whether any nearby vehicle is travelling while the vehicle 100 is stopped; whether there is a space in the vicinity of the vehicle 100 to stop; whether a vehicle and an object could collide; where a pedestrian or a bicycle is located with reference to the vehicle 100; a type of a roadway in which the vehicle 100 is travelling, a status of a traffic light in the vicinity of the vehicle 100, and movement of the vehicle 100. The object information may be included in the vehicle driving information.

The processor 370 may provide the generated object to the controller 170.

In some implementations, the object detection device 300 may include a plurality of processors 370 or may not include the processor 370. For example, each of the camera 310, the radar 320, the lidar 330, the ultrasonic sensor 340, and the infrared sensor 350 may include its own processor.

The object detection device 300 may operate under control of the controller 170 or a processor inside the vehicle 100.

The communication device 400 is configured to perform communication with an external device. Here, the external device may be a nearby vehicle, a mobile terminal, or a server.

To perform communication, the communication device 400 may include at least one selected from among a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcast transmission and reception unit 450, and a processor 470.

In some implementations, the communication device 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include at least one of a Global Positioning System (GPS) module, a Differential Global Positioning System (DGPS) module, and a Carrier phase Differential GPS (CDGPS) module.

The location information unit 420 may acquire GPS information using a GPS module. The location information unit 420 may transmit the acquired GPS information to the controller 170 or the processor 470. The GPS information acquired by the location information unit 420 may be used for autonomous travelling of the vehicle 100. For example, the controller 170 may control the vehicle 100 to travel autonomously based on GPS information and navigation information acquired by the navigation system 770.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian(V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some implementations, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The processor 470 may control the overall operation of each unit of the communication device 400.

Vehicle driving information may include information that is received using at least one of the short-range communication unit 410, the location information unit 420, the V2X communication unit 430, the optical communication unit 440, and the broadcast transmission and reception unit 450.

For example, the vehicle driving information may include information about a location, a type, a travel path, a speed, and a variety of sensing values of a different vehicle, the information which is received from the different vehicle. If information on a variety of sensing information of the different vehicle is received using the communication device 400, the controller 170 may acquire information on various objects existing around the vehicle 100, even though the vehicle 100 does not have an additional sensor.

For example, the vehicle driving information may indicate: a type, a location, and movement of an object existing around the vehicle 100; whether a traffic line exists in the vicinity of the vehicle 100; whether any nearby vehicle is travelling while the vehicle 100 is stopped; whether there is a space in the vicinity of the vehicle 100 to stop; whether a vehicle and an object could collide; where a pedestrian or a bicycle is located with reference to the vehicle 100; a type of a roadway in which the vehicle 100 is travelling, a status of a traffic light in the vicinity of the vehicle 100, and movement of the vehicle 100.

In some implementations, the communication device 400 may include a plurality of processors 470, or may not include the processor 470.

In a case where the communication device 400 does not include the processor 470, the communication device 400 may operate under control of the controller 170 or a processor of a device inside of the vehicle 100.

In some implementations, the communication device 400 may implement a vehicle display device, together with the user interface device 200. In this case, the vehicle display device may be referred to as a telematics device or an Audio Video Navigation (AVN) device.

The communication device 400 may operate under control of the controller 170.

The maneuvering device 500 is configured to receive a user command for driving the vehicle 100.

In the manual driving mode, the vehicle 100 may operate based on a signal provided by the maneuvering device 500.

The maneuvering device 500 may include a steering input device 510, an acceleration input device 530, and a brake input device 570.

The steering input device 510 may receive a user command for steering of the vehicle 100. The user command for steering may be a command corresponding to a specific steering angle. For example, a user command for steering may correspond to 45 degrees to the right.

The steering input device 510 may take the form of a wheel to enable a steering input through the rotation thereof. In this case, the steering input device 510 may be called a steering wheel or a handle. The steering wheel may be rotated within a range of angle limited by control of the controller 170. For example, under the control of the controller 170, the steering wheel may be rotated between 30 degrees to the right and 45 degrees to the left.

In some implementations, the steering input device may be provided as a touchscreen, a touch pad, or a button.

The acceleration input device 530 may receive a user command for acceleration of the vehicle 100.

The brake input device 570 may receive a user command for deceleration of the vehicle 100. Each of the acceleration input device 530 and the brake input device 570 may take the form of a pedal. In this case, a depth up to which an accelerator pedal or a brake pedal is able to be pressed may be limited by control of the controller 170. For example, under the control of the controller 170, the accelerator pedal or the brake pedal may be pressed up to 50% of the maximum available depth.

In some implementations, the acceleration input device or the break input device may be configured as a touch screen, a touch pad, or a button.

The maneuvering device 500 may operate under control of the controller 170.

The vehicle drive device 600 is configured to electrically control the operation of various devices of the vehicle 100.

The vehicle drive device 600 may include a power train drive unit 610, a chassis drive unit 620, a door/window drive unit 630, a safety apparatus drive unit 640, a lamp drive unit 650, and an air conditioner drive unit 660.

In some implementations, the vehicle drive device 600 may further include other components in addition to the aforementioned components, or may not include some of the aforementioned components.

In some implementations, the vehicle drive device 600 may include a processor. Each unit of the vehicle drive device 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In a case where an electric motor is the power source, the power source drive unit 611 may control the motor. The power source drive unit 610 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

In some implementations, in a case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

In some implementations, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In some implementations, the suspension drive unit 623 may control a plurality of suspensions individually.

The door/window drive unit 630 may perform electronic control of a door device or a window device inside the vehicle 100.

The door/window drive unit 630 may include a door drive unit 631 and a window drive unit 632.

The door drive unit 631 may control the door device. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window device. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive device 600 may include a processor. Each unit of the vehicle dive device 600 may include its own processor.

The vehicle drive device 600 may operate under control of the controller 170.

The operation system 700 is a system for controlling the overall operation of the vehicle 100. The operation system 700 may operate in an autonomous mode. The operation system 700 may perform autonomous driving of the vehicle 100 based on location information and navigation information of the vehicle 100.

The operation system 700 may include the driving system 710, the vehicle pulling-out system 740, and the vehicle parking system 750.

In some implementations, the operation system 700 may further include other components in addition to the aforementioned components, or may not include some of the aforementioned component.

In some implementations, the operation system 700 may include a processor. Each unit of the operation system 700 may include its own processor.

In some implementations, in some implementations, in a case where the operation system 700 is implemented as software, the operation system 700 may be a subordinate concept of the controller 170.

In some implementations, in some implementations, the operation system 700 may be a concept including at least one selected from among the user interface device 200, the object detection device 300, the communication device 400, the vehicle drive device 600, and the controller 170.

The driving system 710 may perform driving of the vehicle 100.

The driving system 710 may perform driving of the vehicle 100 by providing a control signal to the vehicle drive device 600 in response to reception of navigation information from the navigation system 770.

The driving system 710 may perform driving of the vehicle 100 by providing a control signal to the vehicle drive device 600 in response to reception of object information from the object detection device 300.

The driving system 710 may perform driving of the vehicle 100 by providing a control signal to the vehicle drive device 600 in response to reception of a signal from an external device through the communication device 400.

The parking-out system 740 may park the vehicle 100 out of a parking space.

The parking-out system 740 may park the vehicle 100 out of a parking space, by providing a control signal to the vehicle drive device 600 based on location information of the vehicle 100 and navigation information provided by the navigation system 770.

The parking-out system 740 may park the vehicle 100 out of a parking space, by providing a control signal to the vehicle drive device 600 based on object information provided by the object detection device 300.

The parking-out system 740 may park the vehicle 100 out of a parking space, by providing a control signal to the vehicle drive device 600 based on a signal provided by an external device.

The parking system 750 may park the vehicle 100 in a parking space.

The vehicle parking system 750 may perform an operation of parking the vehicle 100 in a parking space, by providing a control signal to the vehicle drive device 600 based on location information of the vehicle 100 and navigation information provided by the navigation system 770.

The parking system 750 may park the vehicle 100 in a parking space, by providing a control signal to the vehicle drive device 600 based on object information provided by the object detection device 300.

The parking system 750 may park the vehicle 100 in a parking space, by providing a control signal to the vehicle drive device 600 based on a signal provided by an external device.

The navigation system 770 may provide navigation information. The navigation information may include at least one of the following: map information, information on a set destination, information on a route to the set destination, information on various objects along the route, lane information, and information on the current location of a vehicle.

The navigation system 770 may include a memory and a processor. The memory may store navigation information. The processor may control the operation of the navigation system 770.

In some implementations, the navigation system 770 may update pre-stored information by receiving information from an external device through the communication device 400.

In some implementations, the navigation system 770 may be classified as an element of the user interface device 200.

The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a yaw sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal. The information acquired by the sensing unit 120 may be included in vehicle driving information.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

In some implementations, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be provided as an element of the controller 170.

The power supply unit 190 may supply power required to operate each component under control of the controller 170. In particular, the power supply unit 190 may receive power from, for example, a battery inside the vehicle 100.

The controller 170 may control overall operation of each unit in the vehicle 100. The controller 170 may be referred to as an Electronic Control Unit (ECU).

When the vehicle 100 is in an autonomous mode, the controller 170 may perform autonomous driving of the vehicle 100 based on information acquired by devices provided in the vehicle 100. For example, the controller may control the vehicle 100 based on navigation information provided by the navigation system 770 and information provided by the object detection device 300 or the communication device 400.

When the vehicle 100 is in a manual driving mode, the controller may control the vehicle 100 based on an input signal corresponding to a user command received by the driving manipulation device 500.

When the vehicle is in a remote control mode, the controller 170 may control the vehicle 100 based on a remote control signal received by the communication device 400.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Figure 8:
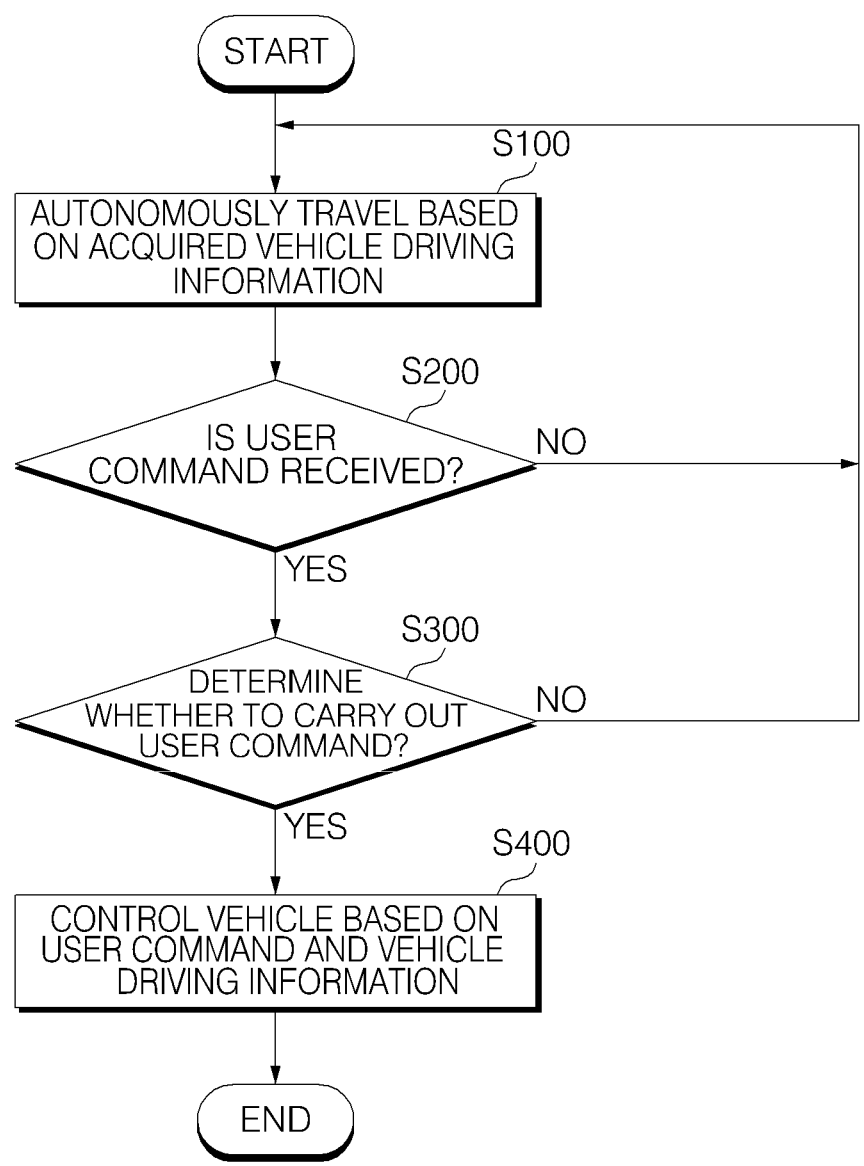
FIG. 8 is a flowchart illustrating an example method for controlling an autonomous vehicle.

FIG. 8 is a flowchart illustrating an example method for controlling an autonomous vehicle.

Referring to FIG. 8, a control method of the vehicle 100 may include: acquiring vehicle driving information during autonomous travelling of the vehicle 100; when a user command is received, determining, based on the vehicle driving information, whether to apply the user command; controlling the vehicle 100 based on the user command and the vehicle driving information in response to determination to apply the user command, whilst controlling the vehicle 100 based solely on the vehicle driving information in response to determination to ignore the user command.

When the vehicle 100 is in the autonomous mode, the controller 170 may control autonomous travel of the vehicle 100 based on vehicle driving information acquired from various units provided in the vehicle 100 in S100.

When the vehicle 100 is travelling autonomously, the controller 170 may control the vehicle 100 based on the vehicle driving information without a user's control command.

When the vehicle 100 is travelling autonomously, the controller 170 may determine whether a user command has been received via an input device in S200.

The input device may include at least one of the user interface device 200 and the driving manipulation device 500.

If a user command is received using the input device while the vehicle 100 travels autonomously, the controller 170 may determine, based on the acquired vehicle driving information, whether to apply the user command in S300.

If it is determined that the user command is inconsistent with the vehicle driving information, the controller 170 may determine to ignore the user command.

If it is determined that the user command is consistent with the vehicle driving information, the controller 170 may determine to apply the user command.

If it is determined that driving the vehicle 100 based on a user command will increase a probability of collision with an object, increase impact impulse of the collision with the object, violate a traffic regulation, or render the vehicle 100 out of control, the controller 170 may determine that the user command is inconsistent with vehicle driving information. In other cases, the controller 170 may determine that the user command is consistent with the vehicle driving information.

For example, if it is determined that driving the vehicle 100 based on a user command will lead to collision with an object, the controller 170 may determine that the user command is inconsistent with vehicle driving information. The controller 170 may determine, based on the vehicle driving information, whether the vehicle 100 will collide with the object when travelling based on the user command.

The object may include a nearby vehicle, a pedestrian, a bicycle, a structure, and an animal.

For example, if it is determined that driving the vehicle 100 based on a user command will increase a probability that the vehicle 100 collides with an object, the controller 170 may determine that the user command is inconsistent with vehicle driving information. Specifically, the controller 170 may determine, based on vehicle driving information, a change in a probability for the vehicle 100 to collide with the object, the change in the probability which is expected when the vehicle 100 travels based on a user command. For example, if a probability of collision between the vehicle 100 and an object is 10% in the current situation and expected to increase to 80% when the vehicle 100 travels based on a user command, the controller 170 may determine that the user command is inconsistent with vehicle driving information.

For example, if it is determined that traveling of the vehicle 100 based on a user command will increase impact impulse of collision between the vehicle 100 and an object, the controller 170 may determine that the user command is inconsistent with vehicle driving information. If it is determined, based on the vehicle driving information, that the vehicle 100 is unable to avoid the collision with the object, the controller 170 may control the vehicle 100 to reduce the impact impulse from the collision. For example, if it is determined that the vehicle 100 is unable to avoid an object approaching from the side of the vehicle 100, the controller 170 may control the vehicle 100 so that the object collides with a part of the front or rear of the vehicle 100. As a result, the vehicle 100 would spin after the collision, so the impact impulse transferred to the vehicle 100 may be reduced. In addition, at a time when the vehicle 100 collides with an object, the controller 170 may control the vehicle 100 to move in a direction corresponding to a direction of the object so as to reduce impact impulse transferred to the vehicle 100. When the vehicle 100 collides with an object, impact impulse transferred to the vehicle 100 moving under control of the controller 170 may be relatively less than impact impulse transferred to the vehicle 100 moving based on a user command.

For example, if it is determined that travelling of the vehicle 100 based on a user command is expected to increase impact impulse transferred to an occupant in a collision between the vehicle 100 and an object, the controller 170 may determine that the user command is inconsistent with vehicle driving information. The controller 170 may determine a location of an occupant based on driver state information. By considering the location of the occupant and a direction in which the vehicle 100 will collide with the object, the controller 170 may determine impact impulse that is expected to be transferred to the occupant in the collision between the vehicle 100 and the object.

For example, if it is determined that driving the vehicle 100 based on a user command will result in violation of a traffic regulation, the controller 170 may determine that the user command is inconsistent with vehicle driving information. For example, the violation of the traffic regulation may include crossing the centerline, changing a traffic lane in a lane change-prohibited zone, entering a specific vehicle-dedicated road into which entrance is prohibited, straying from a driveway, driving while disobeying a traffic sign, and violating a traffic signal. When the vehicle 100 is travelling based on a user command, the controller 170 may determine, based on vehicle driving information, whether the vehicle 100 violates a traffic regulation. For example, if a user command for acceleration is received in a case where the current speed of the vehicle 100 is 80 km/h and a speed limit on a road on which the vehicle 100 is travelling is 80 km/h, the controller 170 may determine that the user command is inconsistent with vehicle driving information.

For example, if it is determined that driving the vehicle 100 based on a user command will render the vehicle 100 out of control, the controller 170 may determine that the user command is inconsistent with vehicle driving information. For example, an out-of-control state may include slipping to the point where the vehicle 100 is uncontrollable, falling down from a cliff, and occurrence of an understeering or oversteering sensation. For example, based on vehicle driving information, the controller 170 may determine a state of a road surface on which the vehicle 100 is travelling, a speed of the vehicle 100, and the maximum steering angle which does not cause the vehicle 100 to slip. If a steering angle corresponding to a received user command is greater than the determined maximum steering angle in a case where ice is present on the road and a speed of the vehicle 100 is 80 km/h, the controller 170 may determine that the user command is inconsistent with vehicle driving information.

For example, if travelling of the vehicle 100 based on a user command will lead the vehicle 100 to stray from a set path during an automatic parking operation, the controller 170 may determine that the user command is inconsistent with vehicle driving information. For automatic parking of the vehicle 100, the controller 170 may set a parking path along which the vehicle 100 is to be parked. If it is determined that the vehicle 100 will not stray from the set parking path even when a received user command is applied, the controller 170 may apply the user command for the automatic parking operation. For example, if a user command for acceleration is received during an automatic parking operation of the vehicle 100, the controller 170 may increase a speed of the vehicle 100 as long as the vehicle 100 does not stray from a set parking path.

In response to determination to apply the user command, the controller 170 may control the vehicle 100 based on the user command and the vehicle driving information in 5400.

The controller 170 may control the vehicle 100 based on a user command and a vehicle driving command, so that a driver's intention may be reflected in driving the vehicle 100.

In response to determination to ignore the user command, the controller 170 may control the vehicle 100 based solely on vehicle driving information in S100.

Figure 9:
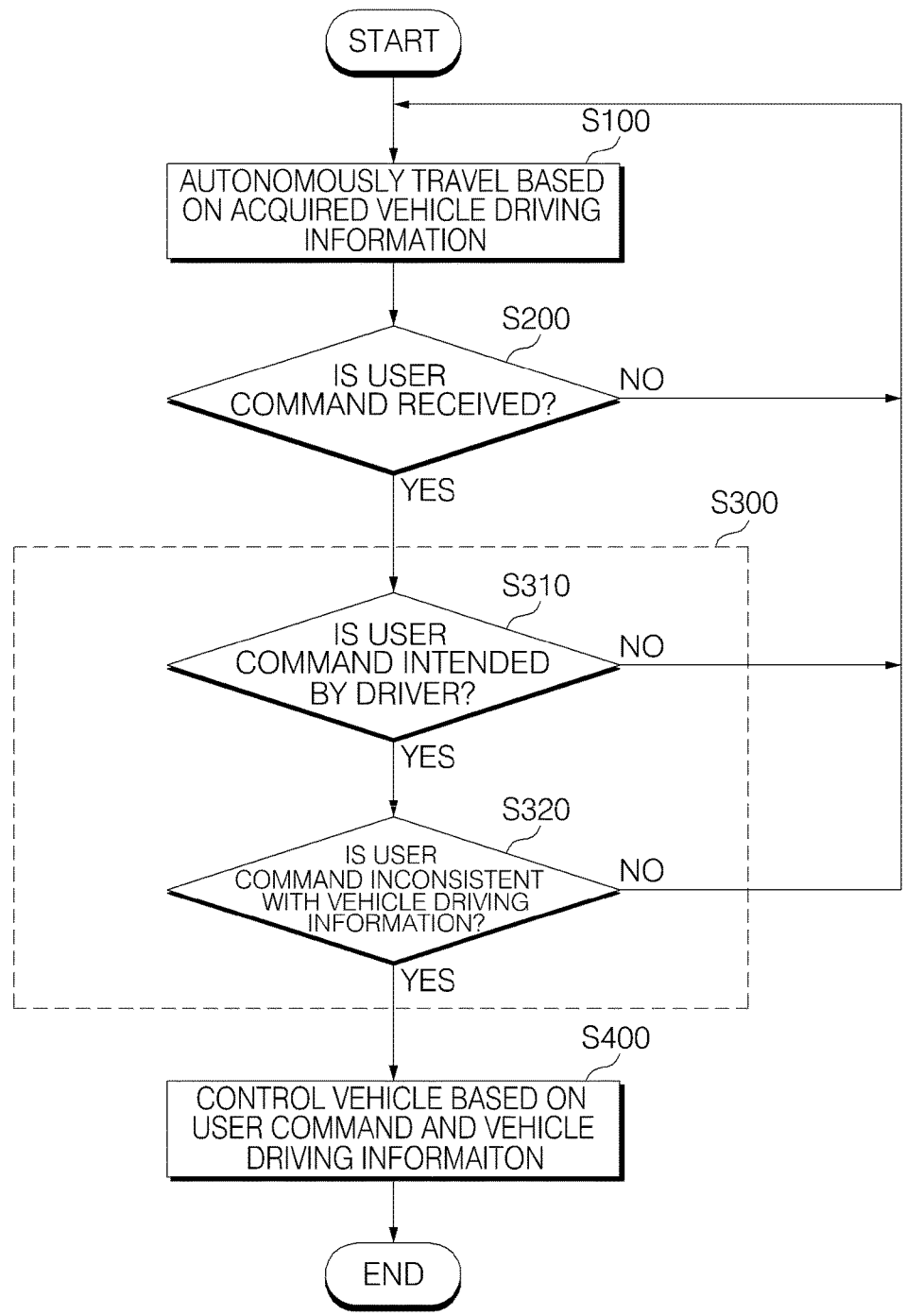
FIG. 9 is a flowchart illustrating another example method for controlling an autonomous vehicle.

FIG. 9 is a flowchart illustrating another example method for controlling an autonomous vehicle.

When the vehicle 100 is in an autonomous mode, the controller 170 may control the vehicle 100 based on vehicle driving information, which is acquired from various units provided in the vehicle 100, so that the vehicle 100 can travel autonomously in 5100. The controller 170 may acquire driver state information from the occupant sensing unit 240 during autonomous travelling of the vehicle 100 in S100.

The driver state information may include a driver's image or biometric information detected using the internal camera 220 or the biometric detection unit 230. For example, the driver state information may be information that is generated based on an image acquired using the internal camera 220, the image which is about a driver's gaze, face, behavior, facial expression, and location. For example, the driver state information may be information that is acquired using the biometric sensor 230, the information which is about a user's biometric information. For example, the driver state information may indicate a direction in which a gaze of a driver is directed, whether the driver is dozing off, a health condition of the driver, and an emotional state of the driver.

The controller 170 may determine whether a user command is received through an input device during autonomous travelling of the vehicle 100 in S200.

If the user command is received, the controller 170 may determine, based on driver state information, whether the user command is intended by a driver in S310.

For example, if it is determined, based on driver state information, that the driver inputs a user command while looking ahead, the controller 170 may determine that the user command is intended by the driver. For example, if it is determined, based on driver state information, that the driver is dozing off at a time when a user command is received, the controller 170 may determine that the user command is not intended by the driver.

If it is determined that a user command is not intended by the driver, the controller 170 may determine to ignore the user command, and therefore, the controller 170 may control the vehicle based solely on vehicle driving information in S100.

If it is determined that the user command is intended by the driver, the controller 170 may determine whether the user command is inconsistent with the vehicle driving information in S320.

If it is determined that the user command is consistent with the vehicle driving information, the controller 170 may control the vehicle based on the user command and the vehicle driving information in S400.

If it is determined that the user command is inconsistent with the vehicle driving information, the controller 170 may control the vehicle 100 based solely on the vehicle driving information in S100.

FIGS. 10A to 10F illustrate an example method of controlling an autonomous vehicle.

Figure 10A:
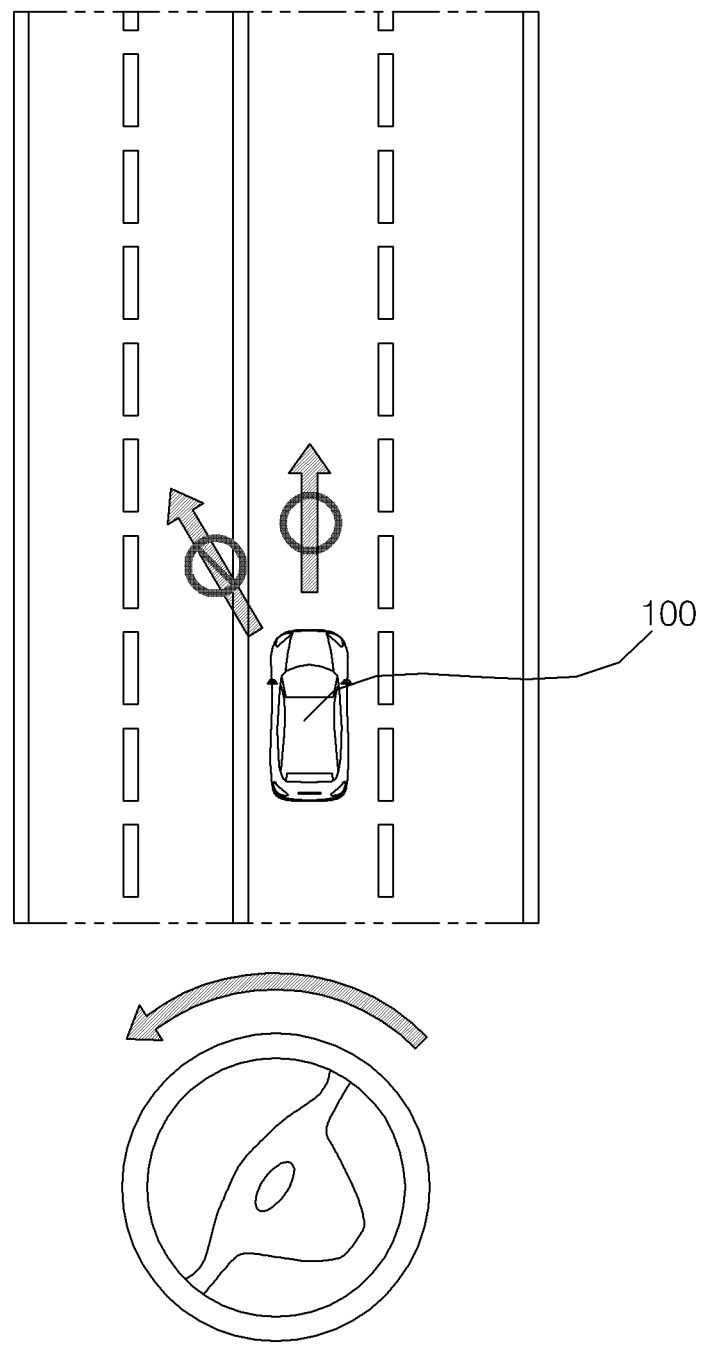
FIGS. 10A to 10F are diagrams illustrating example method of controlling an autonomous vehicle.

Referring to FIG. 10A, if it is determined that driving the vehicle 100 based on a user command will lead the vehicle 100 to cross the centerline, the controller 170 may determine that the user command is inconsistent with vehicle driving information.

Based on the vehicle driving information, the controller 170 may determine a location of the centerline, a location of the vehicle 100, and a distance between the centerline and the vehicle 100.

If a user command for turning a steering direction toward the centerline is received when the vehicle 100 is travelling in a lane right next to the centerline, the controller 170 may determine that the user command is inconsistent with vehicle driving information, and therefore, the controller 170 may determine to ignore the user command. The controller 170 may control the vehicle 100 based solely on the vehicle driving information. In this case, a steering direction of the vehicle 100 which is now travelling may not be changed.

Figure 10B:
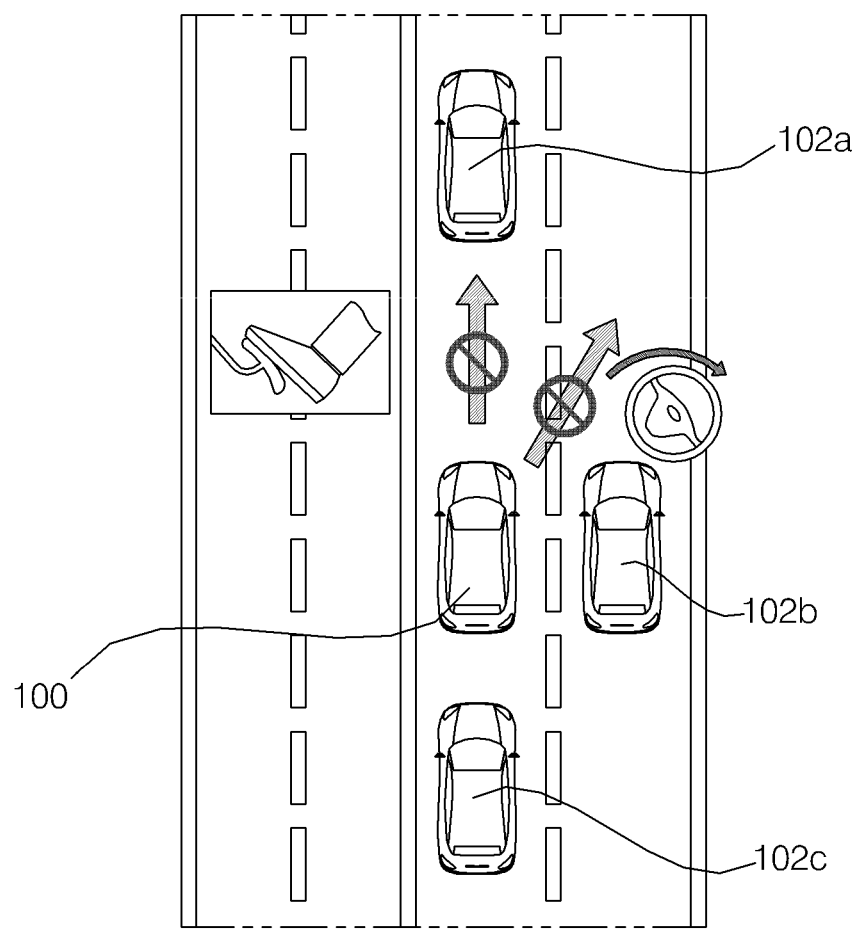

Referring to FIG. 10B, if it is determined that driving the vehicle 100 based on a user command will lead the vehicle 100 to collide with a nearby, the controller 170 may determine that the user command is inconsistent with vehicle driving information.

If a user command for acceleration and a user command for steering are received through the driving manipulation device 500, the controller 170 may determine that each of the two user commands is inconsistent with vehicle driving information.

If it is determined, based on vehicle driving information, that a nearby vehicle 102a exists within a safety distance ahead of the vehicle 100, the controller 170 may determine that a user command for acceleration is inconsistent with the vehicle driving information. In this case, if the vehicle 100 accelerates, a probability to collide with the nearby vehicle 102a will increase. Thus, the controller 170 may ignore the user command for acceleration and control the vehicle 100 based solely on the vehicle driving information.

If it is determined, based on vehicle driving information, that a nearby vehicle 102b exists in a lane next to the vehicle 100, the controller 170 may determine that a user command for turning a steering direction toward the nearby vehicle 102b is inconsistent with the vehicle driving information. In this case, if the steering direction of the vehicle 100 is changed based on the user command, the vehicle 100 may collide with the nearby vehicle 102. Thus, the controller 170 may ignore the user command for steering and control the vehicle 100 based solely on the vehicle driving information.

A nearby vehicle 102c exists in a safety distance behind the vehicle 100, and thus, the controller 170 may ignore the user command although a user command for deceleration is received.

Figure 10C:
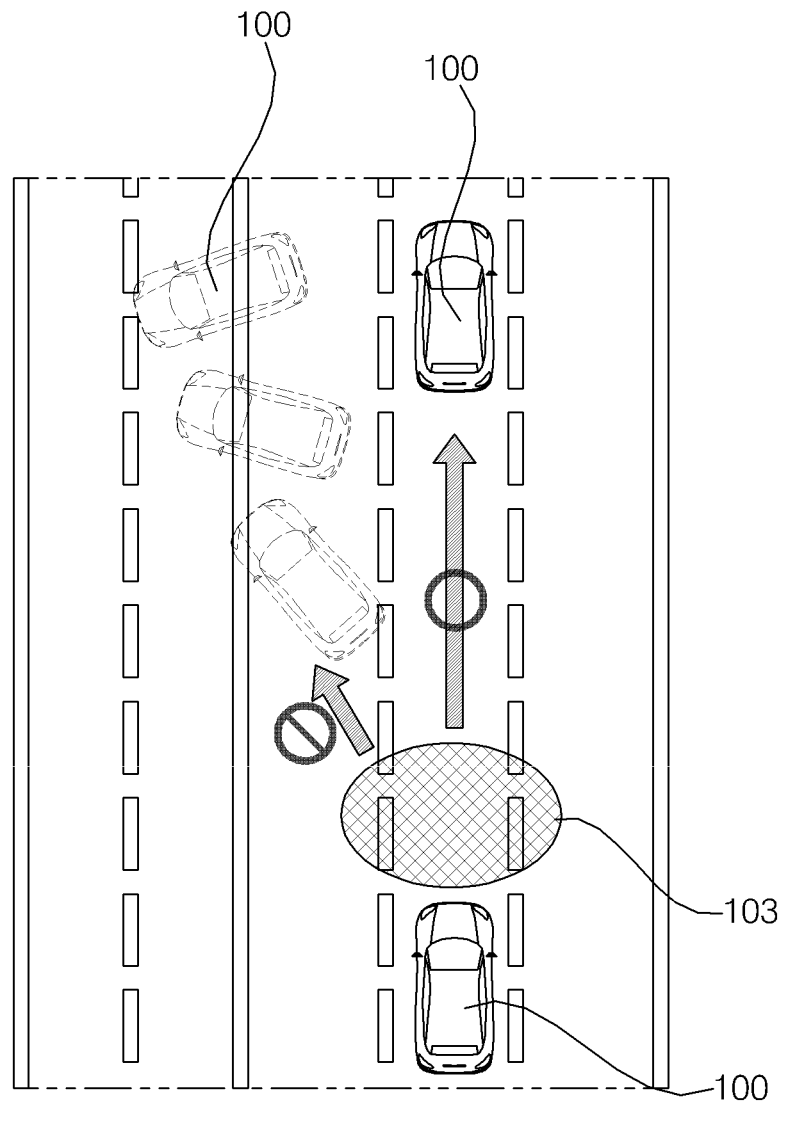

Referring to FIG. 10C, if it is determined that driving the vehicle 100 based on a user command will render the vehicle 100 to be out of control, the controller 170 may determine that the user command is inconsistent with vehicle driving information.

Based on a front camera image included in the vehicle driving information, the controller 170 may determine whether an icy road 103 is present ahead of the vehicle 100.

If a steering direction of the vehicle 100 is changed based on a user command for steering when the vehicle 100 enters the icy road 103, the controller 170 may determine that the vehicle 100 will slip and go out of control.

The controller 170 may determine that the user command for steering, which is received at a time when the vehicle 100 enters the icy road 103, is inconsistent with the vehicle driving information. Based on this determination, the controller 170 may ignore the user command.

The controller 170 may ignore the user command and control the vehicle 100 based solely on the vehicle driving information. Accordingly, when entering the icy road 103, the vehicle 100 may travel without turning its steering direction.

Figure 10D:
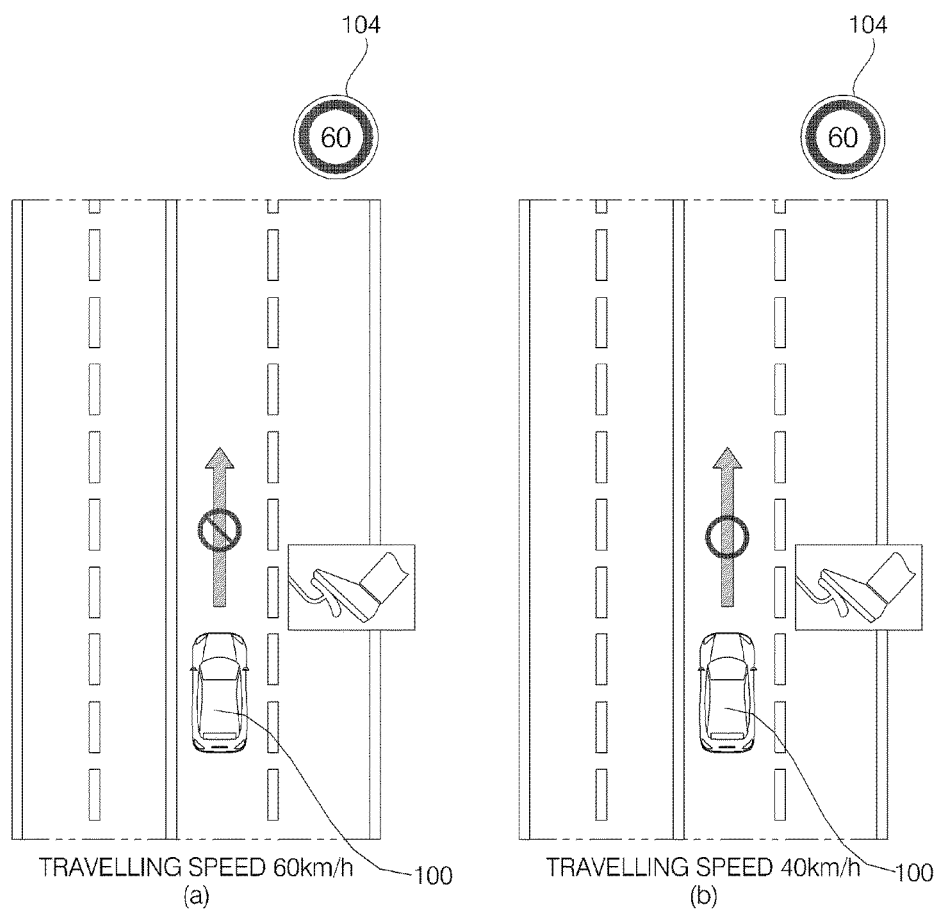

Referring to FIG. 10D, if it is determined that driving the vehicle 100 based on a user command will result in violation of a traffic regulation, the controller 170 may determine that the user command is inconsistent with vehicle driving information.

Based on traffic sign information included in the vehicle driving information, the controller 170 may recognize that a speed limit is 60 km/h on a roadway on which the vehicle 100 is travelling.

In the example (a), if a user command for acceleration is received while it is determined, based on vehicle driving information, that the vehicle 100 is travelling at 60 km/h, the controller 170 may determine that the user command is inconsistent with the vehicle driving information. In this case, if the vehicle 100 applies the user command for acceleration, the vehicle 100 may violate the speed limit. Thus, the controller 170 may determine that the user command is inconsistent with the vehicle driving information.

The controller 170 may ignore the user command and control the vehicle 100 based solely on the vehicle driving information. In this case, the vehicle 100 may travel without acceleration.

In the example (b), if a user command for acceleration is received while it is determined, based on vehicle driving information, that the vehicle 100 is travelling at 40 km/h, the controller 170 may determine that the user command is consistent with the vehicle driving information. The vehicle 100 is able to accelerate up to the speed limit, and therefore, the controller 170 may determine that the user command is consistent with the vehicle driving information.

The controller 170 may apply a user command for acceleration. The controller 170 may control the vehicle 100 based on the user command and the vehicle driving information. Accordingly, the controller 170 may control the vehicle 100 to accelerate up to the speed limit based on the user command.

Figure 10E:
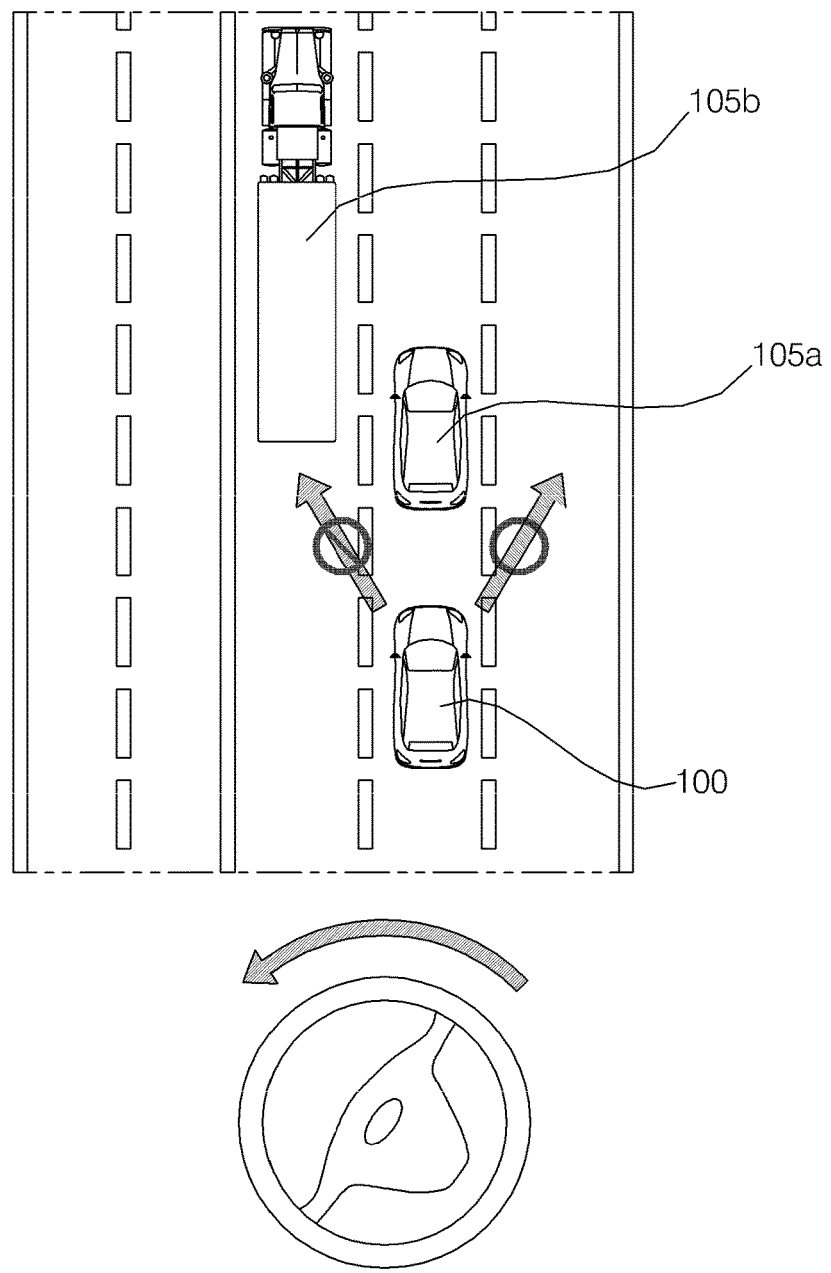

Referring to FIG. 10E, if it is determined that driving the vehicle 100 based on a user command will lead the vehicle 100 to collide with a nearby vehicle 105b, the controller 170 may determine that the user command is inconsistent with vehicle travelling information.

If a driver fails to recognize the presence of a heavy truck 105b when the vehicle 100 possibly collides with the nearby vehicle 105a, the driver may input a user command for turning a steering direction to the left in order to avoid collision with the nearby vehicle 105a. If the vehicle 100 applies the user command for turning a steering direction to the left, the vehicle 100 may collide with the heavy truck 105b.

The controller 170 may recognize the heavy truck 105b based on information provided by the communication device 400 or the object detection device 300, the information which is included in vehicle driving information. Based on the vehicle driving information, the controller 170 may determine that the vehicle 100 needs to turn its steering direction to the right.

The controller 170 may determine that the user command is inconsistent with the vehicle driving information, because a steering direction corresponding to the user command is different from a steering direction determined based on the vehicle driving information. The controller 170 may ignore the user command and control the vehicle 100 based solely on the vehicle driving information. The controller 170 may control the vehicle 100 to turn a steering direction to the right. Accordingly, the vehicle 100 may be able to avoid the collision with any of the nearby vehicle 105a and the heavy truck 105b.

Figure 10F:
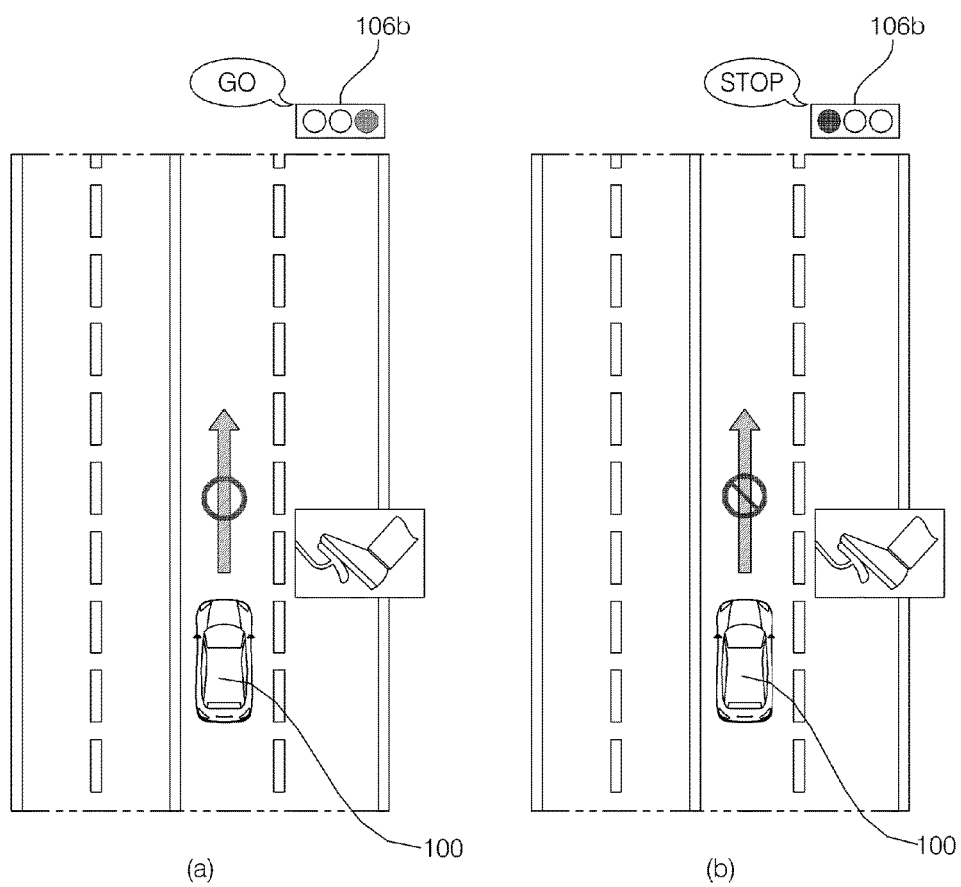

Referring to FIG. 10F, if it is determined that driving the vehicle 100 based on a user command will result in violation of a traffic signal, the controller 170 may determine that the user command is inconsistent with vehicle driving information.

Based on an image of the traffic light 106b detected using the object detection device 300 or based on signal information of the traffic light 106b received using the communication device 400, the controller 170 may determine a signal of a traffic light 106b ahead of the vehicle 100. The vehicle driving information may include the image of the traffic light 106b detected using the object detection device 300 or signal information of the traffic light 106b received using the communication device 400.

In the example (a), if a user command for acceleration is received and it is determined that a signal of the traffic light 106b is green, the vehicle 100 may not violate the traffic signal even when travelling based on the user command. Thus, the controller 170 may determine that the user command is consistent with the vehicle driving information.

The controller 170 may accelerate the vehicle 100 by applying the user command.

In the example (b), if a user command for acceleration is received while it is determined that a signal of the traffic light 106b is red, the vehicle 100 may violate the signal when travelling based on the user command. Thus, the controller 170 may determine that the user command is inconsistent with vehicle driving information.

The controller 170 may ignore the user command and control the vehicle 100 based solely on the vehicle driving information.

Figure 11:
FIG. 11 is a diagram illustrating example user input that is not intended by a driver.
Figure 11:
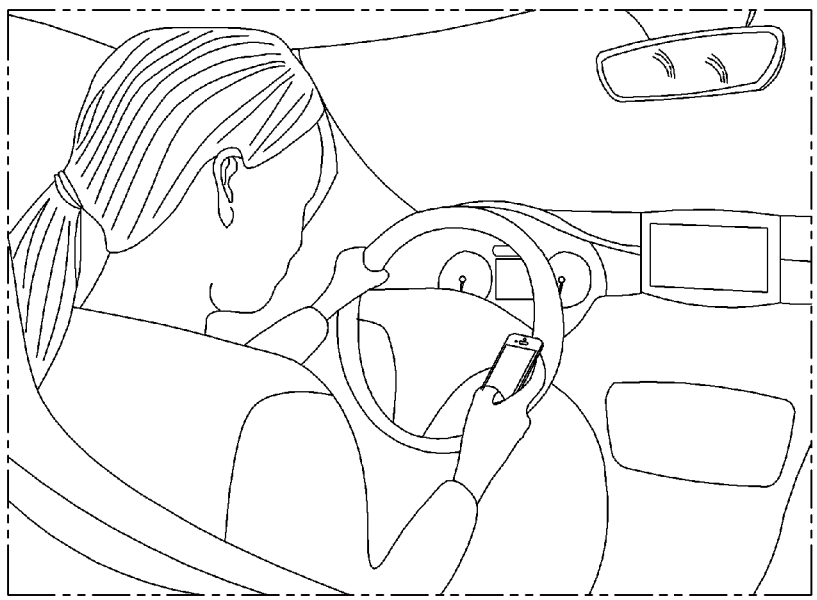

FIG. 11 illustrates example user input that is not intended by a driver.

Referring to the example (a) in FIG. 11, the controller 170 may determine whether a driver is dozing off, based on the driver's image acquired by the internal camera 220.

If it is determined that the driver is dozing off, the controller 170 may determine that a user command is not intended by the driver. In this case, the controller 170 may ignore a user command although the user command is consistent with vehicle driving information. Thus, the controller 170 may control the vehicle 100 based solely on the vehicle driving information.

Referring to the example (b) in FIG. 11, the controller 170 may determine whether a driver is looking ahead, based on the driver's image acquired by the internal camera 220.

If a user command is received while it is determined that the driver is not looking ahead, the controller 170 may determine that the received user command is not intended by the driver. In this case, the controller 170 may ignore the user command although the user command is consistent with vehicle driving information. Thus, the controller 170 may control the vehicle 100 based solely on the vehicle driving information.

Figure 12:
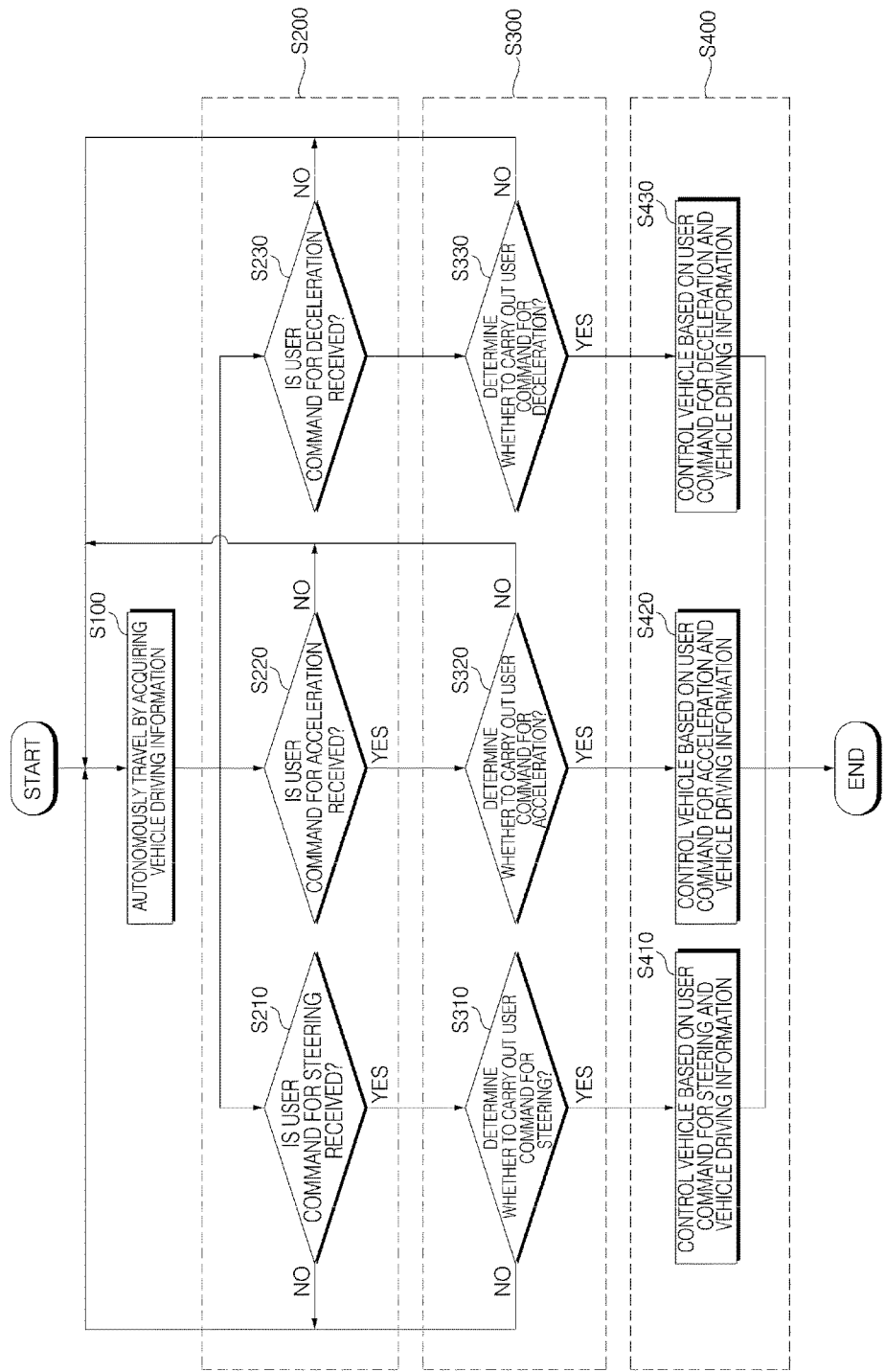
FIG. 12 is a flowchart illustrating an example method for controlling an autonomous vehicle based on one or more user commands.

FIG. 12 is a flowchart illustrating an example method for controlling an autonomous vehicle based on one or more user commands.

When the vehicle 100 is in an autonomous mode, the controller 170 may control the vehicle 100 based on vehicle driving information acquired by various units provided in the vehicle 100, so that the vehicle 100 is able to travel autonomously in S100.

The controller 170 may determine whether at least one of a user command for steering, a user command for acceleration, and a user command for deceleration is received using the driving manipulation device 500 in S200.

The user command for steering may be a user command received through a steering input device. The user command for steering may be a command to turn a steering direction of the vehicle 100. The user command with regard to acceleration may be a user command received through an acceleration input device. The user command for acceleration may be a command to increase a speed of the vehicle 100. The user command for acceleration may be a user command received through a brake input device. The user command for deceleration may be a command to reduce a speed of the vehicle 100.

The controller 170 may determine whether to apply one or more user commands, received using the driving manipulation device 500, individually in S330.

If a user command for steering is received through the driving manipulation device 400 in S210, the controller 170 may determine whether to apply the user command in S310. If it is determined, based on vehicle driving information, that driving the vehicle 100 based on the user command for steering will increase a probability of collision with an object, increase impact impulse from the collision with the object, result in violation of a traffic regulation, or render the vehicle 100 out of control, the controller 170 may determine to ignore the user command for steering. In other cases, the controller 170 may determine to apply the user command for steering.

In response to determination to apply the user command for steering, the controller 170 may control the vehicle based on the user command and vehicle driving information in S410. The controller 170 may turn a steering direction of the vehicle 100 based on the user command and the vehicle driving information.

When a user command for acceleration is received through the driving manipulation device 500 in S220, the controller 170 may determine whether to apply the user command in S320. If it is determined, based on vehicle driving information, that increasing a speed of the vehicle 100 based on the user command will increase a probability of collision with an object, increase impact impulse from the collision with the object, result in violation of a traffic regulation, or render the vehicle 100 out of control, the controller 170 may determine to ignore the user command. In other cases, the controller 170 may determine to apply the user command for acceleration.

In response to determination to apply the user command for acceleration, the controller 170 may control the vehicle 100 based on the user command and the vehicle driving information in S420. The controller 170 may increase a speed of the vehicle 100 based on the user command and the vehicle driving information.

When a user command for deceleration is received through the driving manipulation device 500 in S230, the controller 170 may determine whether to apply the user command for deceleration in S330. If it is determined, based on vehicle driving information, that reducing a speed of the vehicle 100 based on the user command for deceleration will increase a possibility of collision with an object, increase impact impulse from the collision with the object, result in violation of a traffic regulation, or render the vehicle 100 out of control, the controller 170 may determine to ignore the user command. In other cases, the controller 170 may determine to apply the user command for deceleration.

In response to determination to apply the user command for deceleration, the controller 170 may control the vehicle 100 based on the user command and the vehicle driving information in S430. The controller 170 may reduce a speed of the vehicle 100 based on the user command and the vehicle driving information.

Figure 13:
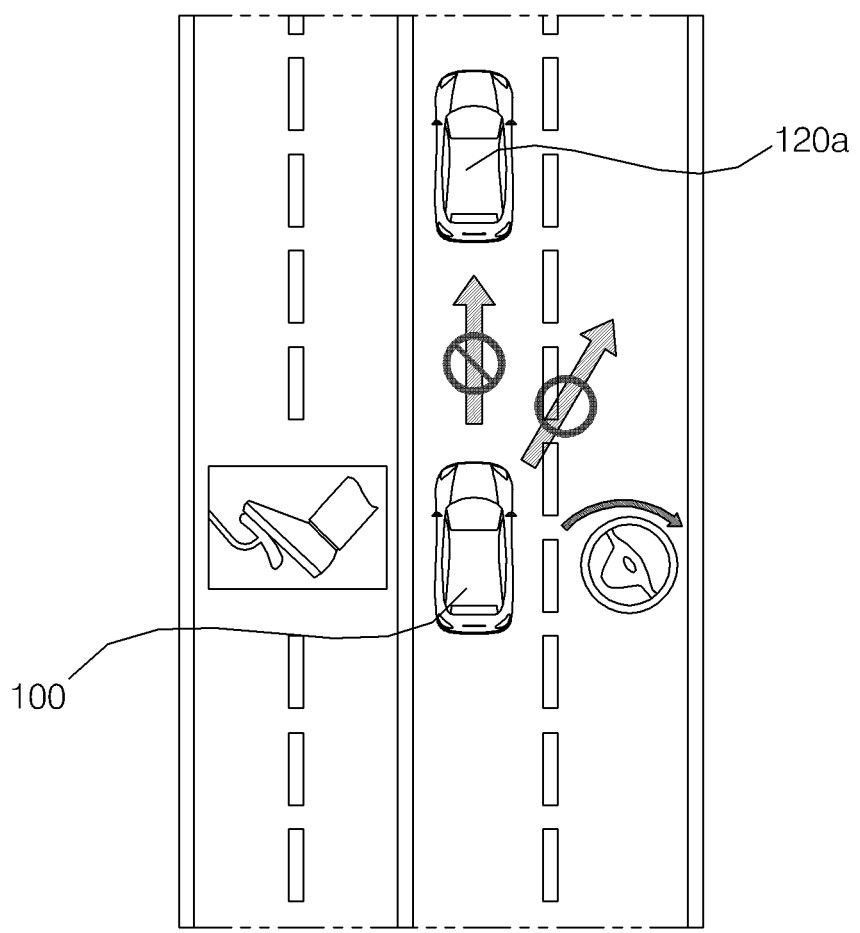
FIG. 13 is a diagram illustrating an example autonomous vehicle that autonomously ravels based on at least one user input.

FIG. 13 illustrates an example autonomous vehicle that autonomously ravels based on at least one user input.

While the vehicle 100 travels autonomously, the controller 170 may receive a user command for acceleration and a user command for steering.

When it is determined, based on vehicle driving information, that a nearby vehicle 120a exists within a safety distance ahead of the vehicle 100, the controller 170 may determine that the user command for acceleration is inconsistent with vehicle driving information. In this case, if the vehicle 100 accelerates based on the user command, a possibility to collide with the nearby vehicle 120a will increase. Thus, the controller 170 may determine to ignore the user command for acceleration. The controller 170 may ignore the user command for acceleration and control the vehicle 100 based on the vehicle driving information.

The controller 170 may receive a user command for turning a steering direction of the vehicle 100 to the right. When it is determined, based on vehicle driving information, that the centerline or an object does not exist on the right side of the vehicle 100, the controller 170 may determine that the user command for steering is consistent with the vehicle driving information. In this case, even when the vehicle 100 turns its steering direction to the right based on the user command, the vehicle 100 may not collide the object, violate a traffic regulation, or go out of control. Thus, the controller 170 may determine to apply the user command for steering. Accordingly, the controller 170 may control the vehicle 100 based on the user command for steering and the vehicle driving information. The vehicle 100 may move rightward based on the user command and the vehicle driving information.

If a user command is applied, the controller 170 may apply all or some of control quantity corresponding to the user command.

A control quantity corresponding to a user command may indicate a specific steering angle or speed variation which corresponds to the user command. For example, if a driver rotates a steering wheel at a specific angle to the right, the control quantity corresponding to a user command may be an angle at which a steering direction of the vehicle 100 is to be turned. For example, if a driver presses an accelerator pedal to a specific depth, a control quantity corresponding to a user command may be an amount of acceleration of the vehicle 100.

In addition, in response to determination to apply a user command, the controller 170 may apply a preset control quantity corresponding to the user command. For example, when applying a user command for turning a steering direction to the right, the controller 170 may control the vehicle 100 to move into the right-hand lane, regardless of an angle corresponding to the user command. In this case, the preset control quantity may be a steering angle that is necessary for the vehicle 100 to perform a lane change maneuver.

If a user command for steering is received and a determination is made to apply the user command, the controller 170 may control the vehicle 100 to perform lane changing, make a left-turn, or make a right turn in a direction corresponding to the user command.

For example, when applying a user command for turning a steering direction to the right, the controller 170 may control the vehicle 100 to move into the right-hand lane or make a right-turn, regardless of a steering angle corresponding to the user command. In this case, the controller 170 may perform a lane change maneuver when there is a lane on the right side of the vehicle 100, or may make a right turn when the vehicle 100 is travelling in the rightmost lane.

If a user command for acceleration is received and it is determined to apply the user command, the controller 170 may increase a speed of the vehicle 100 by a preset amount of acceleration. If a user command for deceleration is received and it is determined to apply the user command, the controller 170 may reduce a speed of the vehicle 100 by a preset amount of deceleration.

For example, when applying a user command for acceleration or deceleration, the controller 170 may change a speed of the vehicle 100 based on a preset speed variation, regardless of a speed variation corresponding to the user command. Accordingly, if a driver presses an accelerator pedal, the controller 170 may increase a speed of the vehicle 100 by a preset value, regardless of the depth to which the accelerator pedal is pressed.

In some implementations, if a user command is received, the controller 170 may calculate a control limit corresponding to the user command based on vehicle driving information. In this case, the controller 170 may control the vehicle 100 based on the vehicle driving information, the user command, and the control limit.

A control limit may indicate the extent to which the vehicle 100 can be controlled based on a user command. For example, a control limit with regard to steering of the vehicle 100 may be right 45 degrees. In this case, although a user command for turning a steering direction of the vehicle 100 at 45 degrees or greater to the right is received, the controller 170 may turn a steering direction of the vehicle 100 up to by 45 degrees to the right.

Figure 14A:
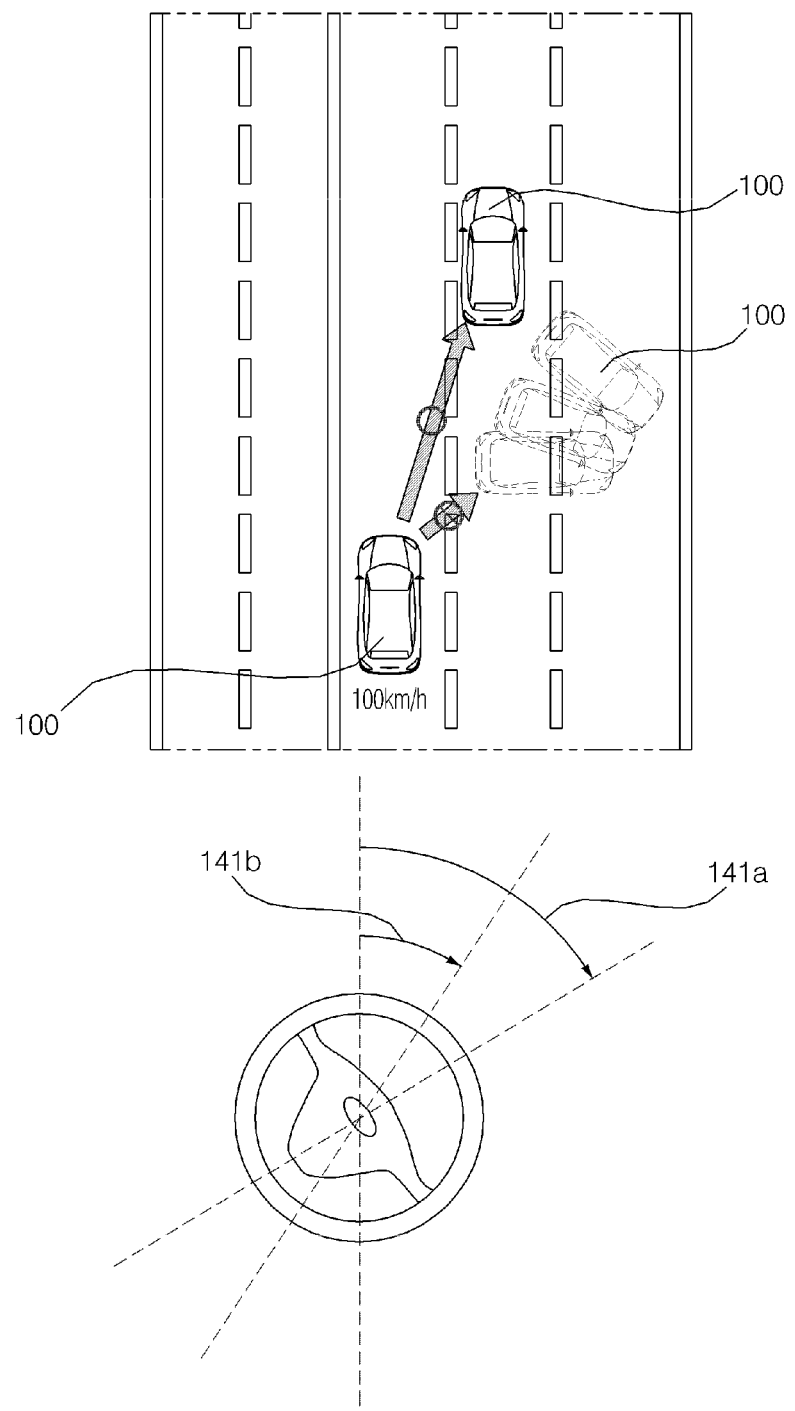
FIGS. 14A and 14B are diagrams illustrating an example vehicle that determines a control limit to apply a user command.
Figure 14B:
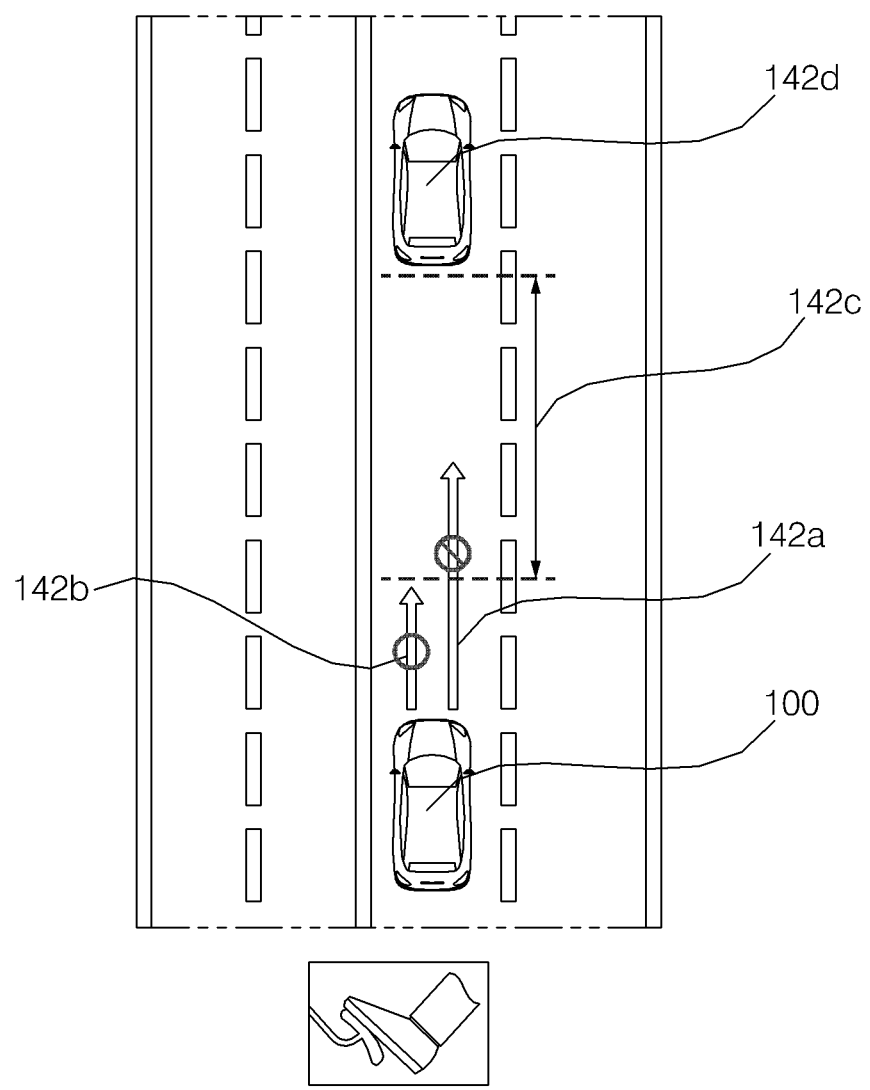

FIGS. 14A and 14B illustrate an example vehicle that determines a control limit to apply a user command.

Referring to FIG. 14A, if a user command for steering is received, the controller 170 may calculate a steering control limit 141b of the vehicle 100. The steering control limit 141b may be a maximum angle at which a steering direction of the vehicle 100 can be turned.

For example, if a user command for steering is received, the controller 170 may determine a speed of the vehicle 100 based on vehicle driving information. Based on speed information of the vehicle 100 and road surface state information, which are included in the vehicle driving information, the controller 170 may calculate a maximum steering angle which does not cause the vehicle 100 to slip. In this case, the maximum steering angle may be referred to as a steering control limit.

Based on the steering control limit 141b, the controller 170 may apply the user command for steering.

For example, when it is determined that a speed of the vehicle 100 is 100 km/h, the vehicle 100 is highly likely to slip by a slight steering variation. Thus, the controller 170 may apply a steering angle 141a corresponding to a user command within the steering control limit 141b. Accordingly, if the steering angle 141a corresponding to a user command is greater than the steering control limit 141b, the controller 170 may control the vehicle 100 to turn a steering direction according to the steering control limit 141b. On contrary, if a steering angle corresponding to a user command is equal to or smaller than the steering control limit 141b, the controller 170 may control the vehicle 100 to turn a steering direction according to the steering angle corresponding to the user command. In this case, the steering angle of the vehicle 100 may be adjusted in proportion of the steering angle corresponding to the user command.

Referring to FIG. 14B, if a user command for acceleration is received, the controller 170 may calculate an acceleration control limit based on vehicle driving information. For example, the controller 170 may calculate a safety distance 142c between the vehicle 100 and a nearby vehicle 142d ahead of the vehicle 100 based on vehicle driving information. If a user command for acceleration is received, the controller 170 may calculate an acceleration control limit 142b based on the calculated safety distance 142c.

Based on the acceleration control limit, the controller 170 may apply the user command.

For example, if a control quantity 142a corresponding to a user command is greater than the acceleration control limit 142b, the controller 170 may control a speed of the vehicle 100 to correspond to the acceleration control limit 142b. On contrary, if a control quantity corresponding to a user command is equal to or smaller than the acceleration control limit 142b, the controller 170 may control a speed of the vehicle 100 to correspond to the control quantity corresponding to the user command.

If a user command for deceleration is received, the controller 170 may calculate a deceleration control limit of the vehicle 100 based on vehicle driving information. Then, based on the deceleration control limit, the controller 170 may apply the user command.

In some implementations, the controller 170 may limit a degree of manipulation by the driving manipulation device 500 according to a control limit.

The driving manipulation device 500 may include: a steering wheel which receives a user command for steering; an acceleration pedal which receives a user command for acceleration; and a brake pedal which receives a user command for deceleration.

If a user command for steering is received, the controller 170 may control a steering wheel based on a steering control limit so as to limit an angle of rotation of the steering wheel.

The controller 170, based on the steering control limit, block the steering wheel from turning more than a first angle. The first angle is an angle corresponding to the steering control limit.

For example, in the case shown in FIG. 14A, the controller 170 may control the steering wheel to be rotated up to an angle 141b corresponding to a calculated steering control limit. In this case, the steering wheel cannot be turned beyond the angle 141b corresponding to the steering control limit. The angle 141b is the first angle.

If a user command for acceleration is received, the controller 170 may control an accelerator pedal based on an acceleration control limit so as to limit a depth up to which the accelerator pedal can be pressed.

The controller 170, based on the acceleration control limit, block the accelerator pedal from being pressed more than a first depth.

The first depth is the maximum depth at which the accelerator pedal can be depressed corresponding to the acceleration control limit.

If a user command for deceleration is received, the controller 170 may control a brake pedal based on a deceleration control limit so as to limit a depth up to which the brake pedal can be pressed.

The controller 170, based on the deceleration control limit, block the brake pedal from being pressed more than a second depth.

The second depth is the maximum depth at which the brake pedal can be depressed corresponding to the deceleration control limit.

For example, in the case shown in FIG. 14B, the controller 170 may control the accelerator pedal to be pressed to a depth corresponding to the acceleration control limit 142b. In this case, the first depth is the depth corresponding to the acceleration control limit 142b. The accelerator pedal cannot be pressed beyond the depth corresponding to the acceleration control limit 142b.

Figure 15:
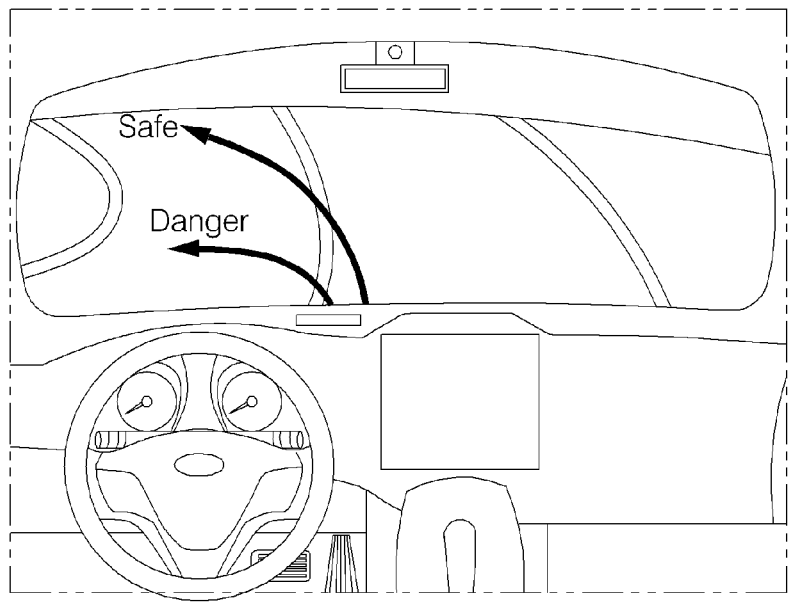
FIG. 15 is a diagram illustrating an example vehicle that outputs a control limit and a control result.
Figure 15:
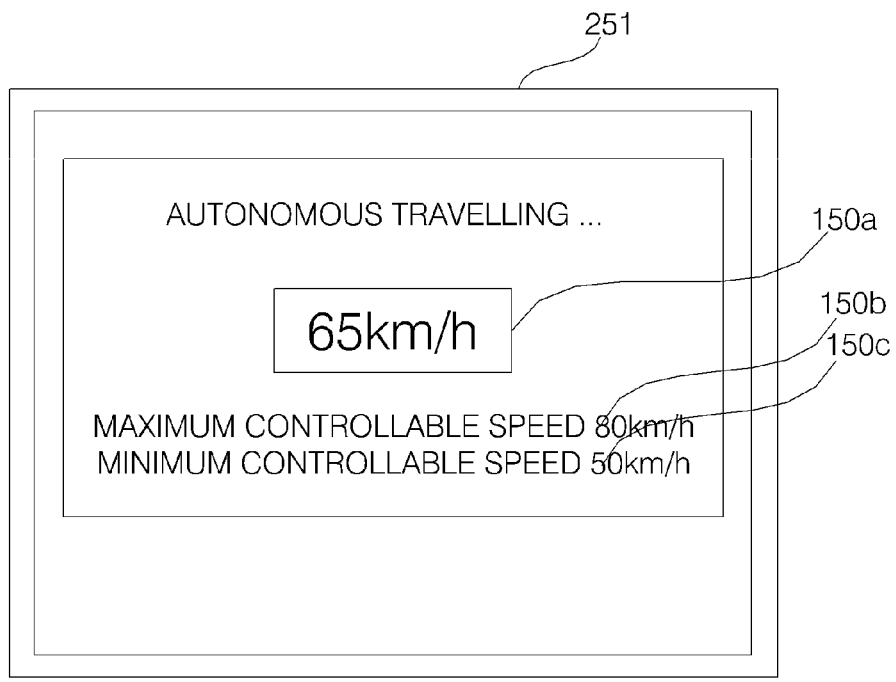

FIG. 15 illustrates an example vehicle that outputs a control limit and a control result.

Referring to the example (a) in FIG. 15, if a user command for steering is received, the controller 170 may output a steering control limit and a result of steering control of the vehicle 100.

If a user command for steering is received, the controller 170 may determine a speed of the vehicle 100 based on vehicle driving information. Based on the speed information of the vehicle 100 and road surface state information, which are included in the vehicle driving information, the controller 170 may calculate a maximum steering angle which does not cause the vehicle 100 to slip.

The controller 170 may output a path to travel based on a user command, and a path to travel in accordance a steering control limit. If a windshield of the vehicle 100 has a transparent display, the controller 170 may display the above two paths on the wind shield. The controller 170 may display the two paths in augmented reality (AR). If a steering angle corresponding to the user command is greater than the steering control limit, a steering angle of the vehicle 100 is controlled according to the steering control limit, and thus, the steering control limit which is identical to a result of steering control of the vehicle 100 may be displayed.

The controller 170 may display, on the wind shield, a path to travel based on the user command.

Referring to the example (b) in FIG. 15, if a user command for acceleration is received, the controller 170 may output an acceleration control limit and a result of speed control of the vehicle 100. If a user command for deceleration is received, the controller 170 may output a deceleration control limit and a result of speed control of the vehicle 100.

The result of speed control of the vehicle 100 based on the user command for acceleration, or the result of speed control of the vehicle 100 based on the user command for deceleration may be the current travelling speed 150*a* of the vehicle 100.

For example, the controller 170 may display the current speed 150*a*, an acceleration control limit 150*b*, and a deceleration control limit 150*c* on the display unit 251 that is provided additionally.

Figure 16:
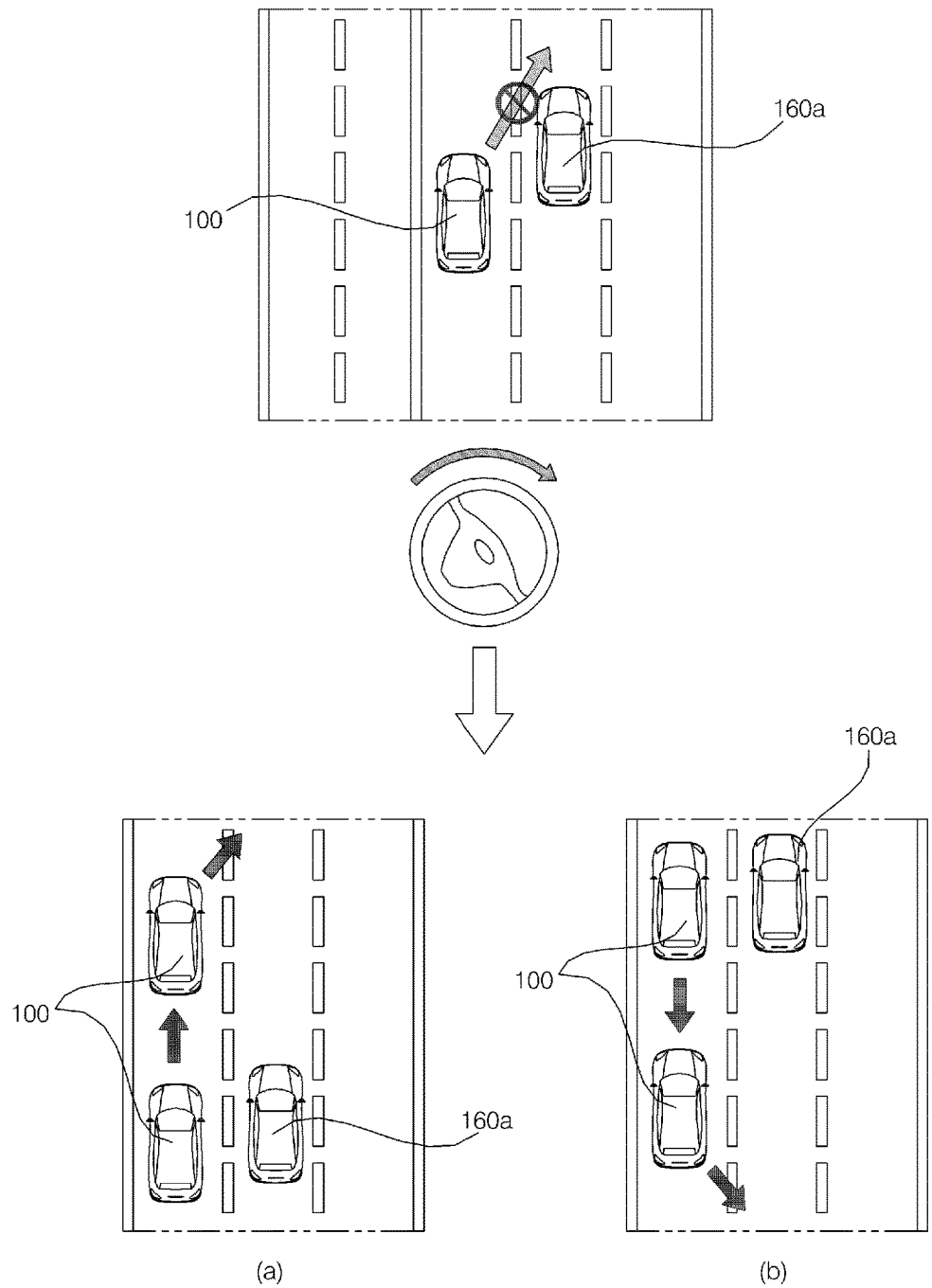
FIG. 16 is a diagram illustrating an example autonomous vehicle that determines a location to which the vehicle moves.

FIG. 16 illustrates an example autonomous vehicle that determines a location to which the vehicle moves.

If it is determined that a user command is inconsistent with vehicle driving information, the controller 170 may determine, based on the user command and the vehicle driving information, a location at which the user command is applicable.

The controller 170, in a state in which the user command is inconsistent with the vehicle driving information, determines a first location at which the user command is applicable.

The first location is a position where the user command and the vehicle driving information may consistent. The controller 170, moves the vehicle to the first location.

The controller 170, controls the vehicle based on the user command and the vehicle driving information.

The controller 170 may move the vehicle 100 to the determined location, and control the vehicle 100 based on the user command and the vehicle driving information.

Referring to FIG. 16, if a user command for lane change is received through an input device and it is determined, based on vehicle driving information, that the vehicle 100 is now not allowed to perform a lane change maneuver, the controller 170 may move the vehicle 100 to a location at which the vehicle 100 is able to perform the lane change maneuver. Then, the controller 170 may control the vehicle 100 based on the user command and the vehicle driving information to perform a lane change maneuver.

The controller 170, in a state in which the input device receives the user command including a user command for lane change, determines, based on the vehicle driving information, whether the user command for changing lanes is applicable.

The controller 170, in a state in which the user command for changing lanes is not applicable, determines a second location at which the user command for changing lanes is applicable.

The second location is a position on the basis of the vehicle driving information, which is determined to be a position at which the vehicle can perform lane change according to a user command.

The controller 170, based on the vehicle driving information, determines the second location where the vehicle 100 is able to perform a lane change maneuver.

The controller 170, moves the vehicle to the second location.

The controller 170, based on the user command and the vehicle driving information, controls the vehicle to change lanes.

If a user command for moving the vehicle 100 into the right-hand lane is received, the controller 170 may determine whether to apply the user command based on vehicle driving information. If it is determined, based on the vehicle driving information, that a nearby vehicle 160*a* exists in the right-hand lane, the controller 170 may determine that the user command is inconsistent with the vehicle driving information, and thus determine to ignore the user command.

If the vehicle 100 is ahead or behind the nearby vehicle 160*a*, the vehicle 100 is able to move into the right-hand lane.

Based on vehicle driving information, the controller 170 may determine a location at which the vehicle 100 is able to perform a lane change maneuver.

Based on vehicle driving information, the controller 170 may determine that the position that is away from the nearby vehicle 160*a* by a first reference distance or more in a traveling lane on which the vehicle 100 travels is the second location. The first reference distance is a reference value for determining the second location.

In the example (a), the controller 170 may accelerate the vehicle 100, so that the vehicle 100 moves to a location at which the vehicle 100 is able to move into the right-hand lane. The controller 170 may control the vehicle 100 to be located a predetermined distance or more ahead of the nearby vehicle 160*a* and then move into the right-hand lane.

In the example (b), the controller 170 may decelerate the vehicle 100, so that the vehicle 100 moves into a location at which the vehicle 100 is able to move into the right-hand lane. The controller 170 may control the vehicle 100 to be located a predetermined distance or more behind the nearby vehicle 160*a* and then move into the right-hand lane.

Figure 17A:
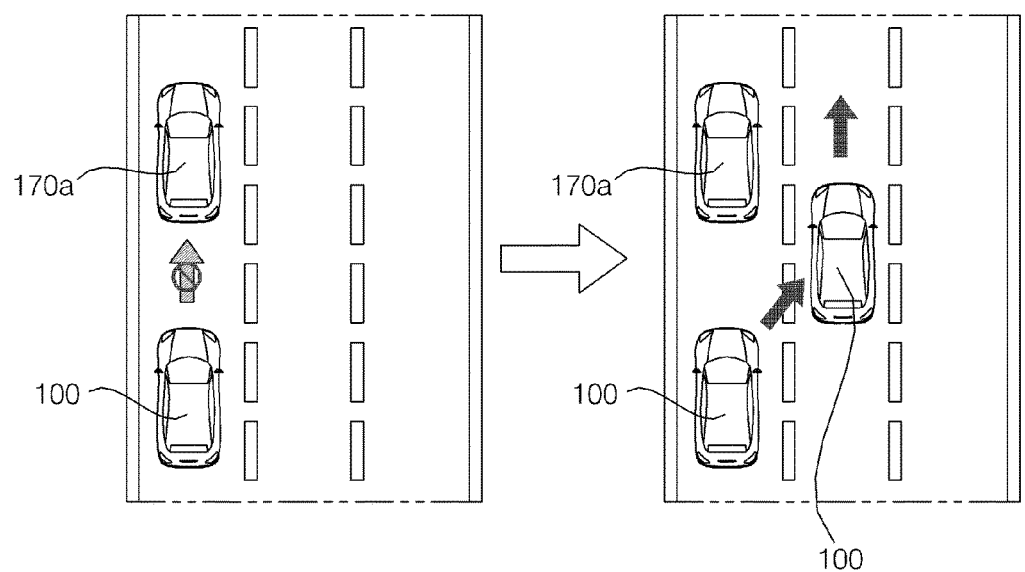
FIGS. 17A and 17B are diagrams illustrating another example autonomous vehicle that determines a location to which the vehicle moves.
Figure 17B:
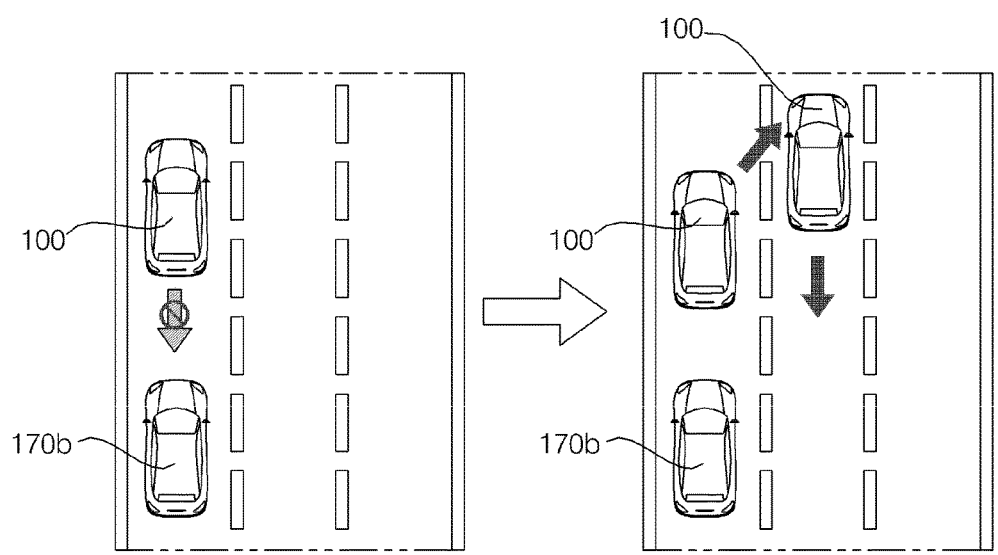

FIGS. 17A and 17B illustrate another example autonomous vehicle that determines a location to which the vehicle moves.

Referring to FIG. 17A, if a user command for acceleration is received through an input device and it is determined, based on vehicle driving information, that the vehicle 100 is now not allowed to accelerate, the controller 170 may move the vehicle 100 into a lane in which the vehicle 100 is able to accelerate. Then, based on the user command for acceleration and the vehicle driving information, the controller 170 may control the vehicle 100 to accelerate.

The controller 170, in a state in which the input device receives the user command including the user command for acceleration, determines, based on the vehicle driving information, whether the user command for acceleration is applicable.

The controller 170, in a state in which the user command for acceleration is not applicable, determines a third location at which the user command for acceleration is applicable.

The third location is a position on the basis of the vehicle driving information, which is determined to be a position at which the vehicle can perform acceleration according to a user command.

The controller 170, based on the vehicle driving information, determines the third location where the vehicle 100 is able to perform acceleration according to a user command.

The controller 170 moves the vehicle to the third location.

The controller 170, based on the user command for acceleration and the vehicle driving information, controls the vehicle to accelerate.

If it is determined, based on vehicle driving information, that a nearby vehicle 170a exists within a safety distance from the vehicle 100, the controller 170 may determine that the vehicle 100 is now not allowed to accelerate. If a user command for acceleration is received, the controller 170 may determine that the user command is inconsistent with the vehicle driving information. The controller 170 may ignore the user command for acceleration.

If it is determined, based on vehicle driving information, that a nearby vehicle does not exists in the right-hand lane and that the vehicle 100 is now able to accelerate in the right-hand lane, the controller 170 may determine that the right-hand lane is a location at which the user command is applicable. The controller 170 determines the right-hand lane as the third position.

The controller 170 may move the vehicle 100 into the right-hand lane.

After moving the vehicle 100 into the right-hand lane, the controller 170 may control the vehicle 100 by applying the user command for acceleration.

Referring to FIG. 17B, if a user command for deceleration is received through an input device and it is determined, based on vehicle driving information, that the vehicle 100 is now not allowed to decelerate, the controller 170 may move the vehicle 100 into a lane in which the vehicle 100 is able to decelerate. Then, based on the user command for deceleration and the vehicle driving information, the controller 170 may control the vehicle 100 to decelerate.

The controller 170, in a state in which the input device receives the user command including a user command for deceleration, determines, based on the vehicle driving information, whether user command for deceleration is applicable.

The controller 170, in a state in which the user command for deceleration is not applicable, determines a fourth location at which the user command for deceleration is applicable.

The fourth location is a position on the basis of the vehicle driving information, which is determined to be a position at which the vehicle can perform deceleration according to the user command.

The controller 170, based on the vehicle driving information, determines the fourth location where the vehicle 100 is able to perform deceleration according to the user command.

The controller 170, moves the vehicle to the fourth location.

The controller 170, based on the user command for deceleration and the vehicle driving information, controls the vehicle to decelerate.

If it is determined, based on vehicle driving information, that a nearby vehicle 170b is travelling within a safety distance behind the vehicle 100, the controller 170 may determine that the vehicle 100 is now not allowed to decelerate. In this case, if a user command for deceleration is received, the controller 170 may determine that the user command is inconsistent with the vehicle driving information. Accordingly, the controller 170 may ignore the user command for deceleration.

If it is determined, based on vehicle driving information, that a nearby vehicle does not exist in the right-hand lane and that the vehicle 100 is now able to decelerate in the right-hand lane, the controller 170 may determine that the right-hand lane is a location at which the user command is applicable. The controller 170 determines the right-hand lane as the fourth position.

The controller 170 may move the vehicle 100 to the right-hand lane.

After moving the vehicle 100 to the right-hand lane, the controller 170 may control the vehicle 100 by applying the user command for deceleration.

in some implementations, the controller 170 may determine whether a user command received through the driving manipulation device 500 and a user command received through the input unit 210 both correspond to vehicle driving information, and then determine whether to apply the user commands based on the determination.

For example, the controller 170 may receive, through the input unit 210, a user command for switching a control mode of the vehicle 100, a user command for changing a preset path, and a user command for activating any of various devices provided in the vehicle 100. For example, during autonomous travelling of the vehicle 100, the controller 170 may receive, through the input unit 210, a user command that requests a manual driving mode.

For example, the controller 170, in a state in which the vehicle is travelling at an autonomous driving mode, determines whether the input device receives the user command including a user command switching to a manual driving mode.

The controller 170, based on a determination that the input device receives the user command switching to the manual driving mode, determine a fifth location at which the manual driving mode is available.

the fifth location is a position on the basis of the vehicle driving information, which is determined to be a position at which the vehicle can switch to the manual driving mode according to the user command.

The controller 170, based on the vehicle driving information, determines the fifth location where the vehicle 100 is able to switch to the manual driving mode according to the user command.

The controller 170, move the vehicle to the fifth location.

For example, if a user command corresponding to a request for a manual driving mode of the vehicle 100 is received and it is determined, based on vehicle driving information, that the vehicle 100 is travelling in an autonomous driving road, the controller 170 may control the vehicle 100 to move into a lane where manual driving is allowed.

If it is determined that the vehicle 100 is travelling on an autonomous driving road or if it is determined that a user command requesting for a manual driving mode is received, the controller 170 may determine that a user command is inconsistent with vehicle driving information.

In this case, a location at which the user command is applicable may be a manual driving road on which a driver is allowed to drive the vehicle 100. The manual driving road is the fifth location.

The controller 170 may determine a location of the manual driving road based on map information included in navigation information, and may control the vehicle 100 to move to the determined location of the manual driving road.

After the vehicle 100 moves to the manual driving road, the controller 170 may switch the vehicle 100 to a manual driving mode based on the user command.

Figure 18:
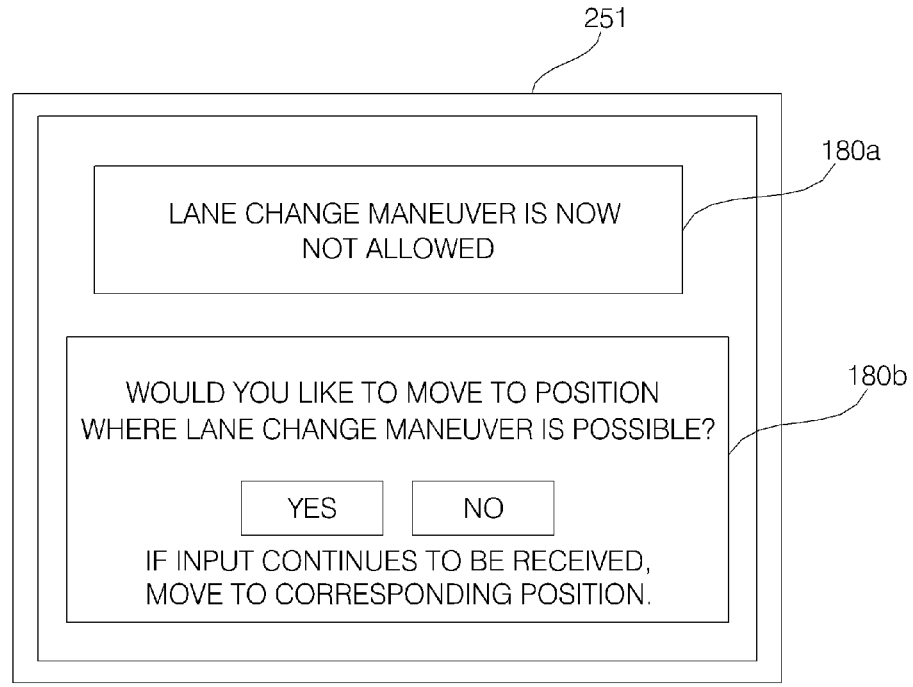
FIG. 18 is a diagram illustrating an example user interface of an autonomous vehicle to get user's confirmation for moving to a particular location.
Figure 18:
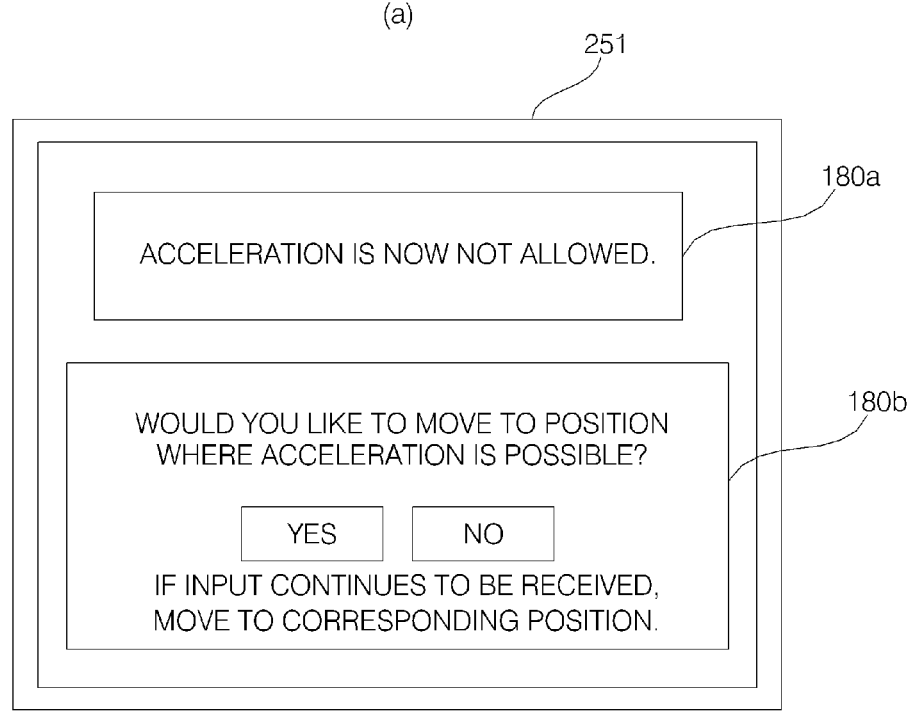

FIG. 18 illustrates an example user interface of an autonomous vehicle to get user's confirmation for moving to a particular location.

If it is determined that a user command is inconsistent with vehicle driving information, the controller 170 may output a notification and a menu to the display unit 250. The notification indicates that the vehicle 100 is now not allowed to apply the user command, and the menu is to get a confirmation from a user as to whether the user wants to move the vehicle 100 to a location at which the user command is applicable.

The controller 170 may output the notification and the menu to at least one of the display unit 251 and the sound output unit 252. The notification and the menu may be output in the form of audio guide that is output via the display unit 251. Hereinafter, the following description is described in the assumption that the notification and the menu is output through the display unit 251.

In the example (a), if a user command for changing a lane is received and it is determined, based on vehicle driving information, that the vehicle 100 is now not allowed to perform a lane change maneuver, the controller 170 may determine that the user command is inconsistent with the vehicle driving information. In this case, the controller 170 may display, on the display unit 251, a notification 180*a* which indicates that the vehicle 100 is now not allowed to perform a lane change maneuver in accordance to the user command. The controller 170 may display, on the display unit 251, a menu 180*b* to confirm whether to move the vehicle 100 to a location at which the lane change maneuver is possible to be performed. The controller 170 may include buttons in the menu 180*b* to receive the user' response responsive to the menu 180*b*.

If a user's response to the menu 180*b* is received and indicates the intention to move into a location at which the user command is applicable, or if a user command continues to be received for a preset period of time or more, the controller 170 may move the vehicle 100 into a determined location. The preset period of time is a value stored in the memory 140, which may be set by a user. For example, the preset period of time may be two seconds.

The controller 170, in a state in which the user command is inconsistent with the vehicle driving information, provides, to the output unit, (i) a notification indicating that the user command is not applicable and (ii) a menu to receive a confirmation, from the user, as to whether the user intends to move the vehicle to the first location at which the user command is applicable.

The first location is a position where the user command and the vehicle driving information may consistent.

The controller 170, (i) in response to the confirmation that the user intends to move the vehicle to the first location or (ii) in a state in which the input device receives two or more user commands that are inconsistent with the vehicle driving information for a first time period, moves the vehicle to the first location.

The first time is the preset period of time.

In the example (a), if a user's selection of YES button in the menu 180*b* is received, the controller 170 may determine that the user's response is received and indicates the intention to move the vehicle 100 to a location at which the vehicle 100 is able to perform a lane change maneuver in accordance to a user command. In this case, the controller 170 may move the vehicle 100 to the location at which the vehicle 100 is able to perform the lane change maneuver. If a user's selection of No button in the menu 180*b* is received or if a user command for lane change continues to be received for a preset period of time or more, the controller 170 may control the vehicle 100 based solely on vehicle driving information, without moving the vehicle 100 to the location at which the vehicle 100 is able to perform the lane change maneuver.

In the example (b), if a user command for acceleration of the vehicle 100 is received and it is determined, based on vehicle driving information, the vehicle 100 is now not allowed to accelerate, the controller 170 may determine that the user command is inconsistent with the vehicle driving information. In this case, the controller 170 may display, on the display unit 251, a notification message 180*a* which indicates that the vehicle 100 is now not allowed to accelerate based on the user command. The control unit 170 may display, on the display unit 251, a menu 180*b* to confirm whether to move the vehicle 100 to a location at which the vehicle 100 is able to acceleration.

If a user's selection of Yes button is received responsive to the menu 180*b*, the controller 170 may determine that a user input is received and indicates the intention to move the vehicle 100 to a location at which the vehicle 100 is able to accelerate based on the user command. In this case, the controller 170 may move the vehicle 100 to the location at which the vehicle 100 is able to accelerate. If a user's selection of No button is received responsive to the menu 180*b* or if a user command for acceleration continues to be received for a preset period of time or more, the controller 170 may control the vehicle 100 based solely on vehicle driving information, without moving the vehicle 100 to the location at which the vehicle 100 is able to accelerate.

In some implementations, if a user command inconsistent with vehicle driving information is received for a preset period of time or more, the controller 170 may control the vehicle 100 to perform a preset operation associated with the user command. The preset period of time is a value stored in the memory 140, which may be set by a user. For example, the preset period of time may be three seconds. The preset operation may be an operation that the vehicle 100 performs in response to a particular user command. The preset operation may be changed by the user. A control command corresponding to the preset operation may be stored in the memory 140. The preset period of time is a second time period.

The controller 170, in a state in which the input device receives two or more user commands that are inconsistent with the vehicle driving information for the second time period, controls the vehicle to perform the preset operation associated with the user command.

For example, if a user command for deceleration continues to be received for a set period of time or more when it is determined, based on vehicle driving information, that the vehicle 100 is now not allowed to decelerate, the controller 170 may control the vehicle 100 to perform emergency stop. For example, emergency stop is an operation of stopping the vehicle 100 temporarily in any available location in the vicinity. In this case, the controller 170 may determine, based on vehicle driving information, an available stopping location closest to the vehicle 100, and then move the vehicle 100 to the determined location. During the emergency stop maneuver, the controller 170 may display a notification message indicative of emergency stop on a display device provided outside the vehicle 100, or may inform a nearby vehicle or road infrastructure that the vehicle 100 is performing emergency stop.

The controller 170 determines whether the input device receives two or more user commands for deceleration for the second time period, the two or more user commands for deceleration being inconsistent with the vehicle driving information.

The controller 170, based on a determination that the input device receives the two or more user commands for deceleration for the second time period, control the vehicle to perform emergency stop.

For example, if it is determined, based on vehicle driving information, that the vehicle 100 is travelling on highways and that a nearby vehicle is travelling behind the vehicle 100, the controller 170 may determine that the vehicle 100 is now not allowed to decelerate. In this case, if a driver presses a brake pedal for three seconds or more, the controller 170 may control the vehicle 100 to perform emergency stop.

For example, if a user command for acceleration continues to be received for a preset period of time or more when it is determined, based on vehicle driving information, that the vehicle 100 is now not allowed to accelerate, the controller 170 may control the vehicle 100 to enter an acceleration mode. The acceleration mode may be a mode in which the vehicle 100 overtakes a nearby vehicle or searches for a lane or path of smooth traffic flow in order to travel at a preset speed.

The controller 170 determines whether the input device receives two or more user commands for acceleration for the second time period, the two or more user commands for acceleration being inconsistent with the vehicle driving information.

The controller 170, based on a determination that the input device receives the two or more user commands for acceleration for the second time period, accelerate the vehicle.

In some implementations, if a user command is received, the controller 170 may output, to the output unit 250, determination as to whether to apply the user command. For example, if a user command is received during autonomous travelling of the vehicle 100, the controller 170 may determine whether to apply the user command, based on the received user command and vehicle driving information, and then display the determination on the display unit 251. Accordingly, a driver of the vehicle 100 may be able to know whether a command input by himself is applicable, and even the reason when the command is not applicable.

In some implementations, the controller 170 determines whether to apply one or more user commands, received through an input device, individually, and may stop applying the user commands individually based on vehicle driving information.

The fact that the controller 170 stops applying a user command indicates that the controller 170, which was controlling the vehicle 100 based on vehicle driving information along with the user command, starts to control the vehicle 100 based solely on the vehicle driving information without the user command. That is, stopping applying the user command includes stopping controlling the vehicle 100 based on the user command and starting to control the vehicle 100 based solely on the vehicle command.

While controlling the vehicle 100 based on a user command and vehicle driving information, the controller 170 may stop applying the user command when it is determined that the user command is inconsistent with the vehicle driving information.

For example, while the vehicle 100 is controlled based on one or more user commands and vehicle driving information in response to determination to apply the user commands, the controller 170 may determine whether at least one of the user commands is inconsistent with the vehicle driving information. When the vehicle 100 is travelling autonomously, surrounding environment of the vehicle 100 and information received via the communication device 400 may be changed. As a result, the vehicle driving information may be changed. Therefore, even a user command which was consistent with previous vehicle driving information may be determined inconsistent with the current vehicle driving information.

If it is determined that at least one user command which is now being applied is inconsistent with vehicle driving information, the controller 170 may stop applying the at least one user command. For example, if it is determined that the vehicle 100 is crossing the centerline based on vehicle driving information while the vehicle 100 is controlled to turn a steering direction based on a user command for steering, which is determined consistent with vehicle driving information, the controller 170 may ignore the user command and control the vehicle 100 not to cross the centerline. For example, if it is determined that a probability of collision with an ahead object will increase to more than a preset value based on vehicle driving information while the vehicle 100 is controlled to increase a travelling speed based on a user command, the controller 170 may ignore the user command and control the vehicle 100 to decelerate. The preset value may be determined through experiments. For example, while the vehicle 100 is controlled to turn a steering direction while accelerating based on a user command for acceleration and a user command for steering, the controller 170 may determine, based on vehicle driving information, to stop turning the steering direction so as to prevent the vehicle 100 from slipping, so that the vehicle 100 may keep accelerating without slipping.

The examples described with reference to FIGS. 1-18 can be modified. In particular, various variations and modifications are possible in the component parts and/or arrangements of the subject combination arrangement within the scope of the disclosure, the drawings and the appended claims. In addition to variations and modifications in the component parts and/or arrangements, any suitable alternatives in the component parts and/or arrangements are possible.

The invention claimed is:
1. A vehicle comprising:
an input device that is configured to receive a user command from a user; and
a controller that is configured to:
obtain vehicle driving information,
based on the vehicle driving information, control the vehicle to travel autonomously,
determine whether the user command is inconsistent with the vehicle driving information,
based on a determination that the user command is inconsistent with the vehicle driving information, determine to ignore the user command,
in response to a determination to ignore the user command, control the vehicle based on the vehicle driving information without the user command,
based on a determination that the user command is consistent with the vehicle driving information, determine to apply the user command, and
in response to a determination to apply the user command, control the vehicle based on the vehicle driving information and the user command,
wherein the controller is configured to:
in a state in which the input device receives two or more user commands that are inconsistent with the vehicle driving information for a second time period, control the vehicle to perform a preset operation associated with the user command.

2. The vehicle of claim 1, wherein the controller is configured to:
   determine whether driving the vehicle based on the user command (i) increases a probability of collision with an object outside the vehicle, (ii) increases impact impulse of a collision with an object, (iii) results in violation of a traffic regulation, or (iv) renders the vehicle out of control,
   based on a determination that driving the vehicle based on the user command (i) increases a probability of collision with an object outside the vehicle, (ii) increases impact impulse of a collision with an object, (iii) results in violation of a traffic regulation, or (iv) renders the vehicle out of control, determine that the user command is inconsistent with the vehicle driving information.

3. The vehicle of claim 2, wherein the controller is configured to:
   receive the user command,
   calculate a control limit corresponding to the user command based on the vehicle driving information, and
   control the vehicle based on the vehicle driving information, the user command, and the control limit.

4. The vehicle of claim 2, further comprising:
   an occupant sensing unit that is configured to monitor driver state and provide driver state information,
   wherein the controller is configured to:
      based on the driver state information, determine whether the user command is not intended by a driver of the vehicle, and
      based on a determination that the user command is not intended by the driver of the vehicle, determine to ignore the user command.

5. The vehicle of claim 2, wherein the input device includes:
   a driving manipulation device that is configured to receive the user command, the user command including at least one user command from a plurality of user commands including a user command for steering, a user command for acceleration, and a user command for deceleration, and
   wherein the controller is configured to determine whether to apply the at least one user command individually.

6. The vehicle of claim 5, wherein the controller is configured to:
   based on a determination to apply the at least one user command that is a user command for steering, control the vehicle to (i) perform lane change maneuver, (ii) make a left-turn, or (iii) make a right-turn using the user command and the vehicle driving information.

7. The vehicle of claim 5, wherein the controller is configured to:
   based on a determination to apply the at least one user command that is a user command for acceleration, increase a speed of the vehicle by a preset amount of acceleration, and
   based on a determination to apply the at least one user command that is a user command for deceleration, decrease a speed of the vehicle by a preset amount of deceleration.

8. The vehicle of claim 5, wherein the controller is configured to:
   in a state in which the driving manipulation device receives the user command including the user command for steering, calculate a steering control limit corresponding to the user command, and
   control the vehicle based on the vehicle driving information, the user command, and the steering control limit.

9. The vehicle of claim 8, wherein the driving manipulation device includes:
   a steering wheel that is configured to receive the user command for steering, and
   wherein the controller is configured to:
      based on the steering control limit, block the steering wheel from turning more than a first angle.

10. The vehicle of claim 5, wherein the controller is configured to:
    in a state in which the driving manipulation device receives the user command including the user command for acceleration, calculate an acceleration control limit corresponding to the user command for acceleration,
    control the vehicle based on the vehicle driving information, the user command, and the acceleration control limit,
    in a state in which the driving manipulation device receives the user command including the user command for deceleration, calculate a deceleration control limit corresponding to the user command for deceleration, and
    control the vehicle based on the vehicle driving information, the user command, and the deceleration control limit.

11. The vehicle of claim 10, wherein the driving manipulation device includes:
    an accelerator pedal that is configured to receive the user command for acceleration, and
    a brake pedal that is configured to receive the user command for deceleration, and
    wherein the controller is configured to:
       based on the acceleration control limit, block the accelerator pedal from being pressed more than a first depth, and
       based on the deceleration control limit, block the brake pedal from being pressed more than a second depth.

12. The vehicle of claim 2, wherein the controller is configured to:
    in a state in which the user command is inconsistent with the vehicle driving information, determine a first location at which the user command is applicable, and
    move the vehicle to the first location, and
    control the vehicle based on the user command and the vehicle driving information.

13. The vehicle of claim 12, wherein the controller is configured to:
    in a state in which the input device receives the user command including a user command for lane change, determine, based on the vehicle driving information, whether the user command for changing lanes is applicable,
    in a state in which the user command for changing lanes is not applicable, determine a second location at which the user command for changing lanes is applicable,
    move the vehicle to the second location, and
    based on the user command and the vehicle driving information, control the vehicle to change lanes.

14. The vehicle of claim 12, wherein the controller is configured to:
    in a state in which the input device receives the user command including the user command for acceleration, determine, based on the vehicle driving information, whether the user command for acceleration is applicable, in a state in which the user command for acceleration is not applicable, determine a third location at which the user command for acceleration is applicable, move the vehicle to the third location, and based on the user command for acceleration and the vehicle driving information, control the vehicle to accelerate.

15. The vehicle of claim 12, wherein the controller is configured to:

in a state in which the input device receives the user command including a user command for deceleration, determine, based on the vehicle driving information, whether user command for deceleration is applicable, in a state in which the user command for deceleration is not applicable, determine a fourth location at which the user command for deceleration is applicable, move the vehicle to the fourth location, and based on the user command for deceleration and the vehicle driving information, control the vehicle to decelerate.

16. The vehicle of claim 12, wherein the controller is configured to:

in a state in which the vehicle is travelling at an autonomous driving mode, determine whether the input device receives the user command including a user command switching to a manual driving mode, based on a determination that the input device receives the user command switching to the manual driving mode, determine a fifth location at which the manual driving mode is available, and move the vehicle to the fifth location.

17. The vehicle of claim 12, further comprising:

an output unit, wherein the controller is configured to:

in a state in which the user command is inconsistent with the vehicle driving information, provide, to the output unit, (i) a notification indicating that the user command is not applicable and (ii) a menu to receive a confirmation, from the user, as to whether the user intends to move the vehicle to the first location at which the user command is applicable, and (i) in response to the confirmation that the user intends to move the vehicle to the first location or (ii) in a state in which the input device receives two or more user commands that are inconsistent with the vehicle driving information for a first time period, move the vehicle to the first location.

18. The vehicle of claim 1, wherein the controller is configured to:

determine whether the input device receives two or more user commands for deceleration for the second time period, the two or more user commands for deceleration being inconsistent with the vehicle driving information, and based on a determination that the input device receives the two or more user commands for deceleration for the second time period, control the vehicle to perform preset emergency stop.

19. The vehicle of claim 1, wherein the controller is configured to:

determine whether the input device receives two or more user commands for acceleration for the second time period, the two or more user commands for acceleration being inconsistent with the vehicle driving information, and based on a determination that the input device receives the two or more user commands for acceleration for the second time period, control the vehicle to operate at a preset acceleration mode.

20. A method of controlling a vehicle at an autonomous driving mode of the vehicle, the method comprising:

receiving one or more user commands including a user command for steering, a user command for acceleration, and a user command for deceleration;

determining whether each of the one or more user commands is inconsistent with vehicle driving information;

in response to determining whether each of the one or more user commands is inconsistent with the vehicle driving information, obtaining at least one user command from the one or more user commands, the at least one user command being consistent with the vehicle driving information;

controlling the vehicle based on the at least one user command and the vehicle driving information;

in a state in which the vehicle is controlled based on the at least one user command and the vehicle driving information, determine whether the at least one user command is changed such that the at least one user command is inconsistent with the vehicle driving information;

based on a determination that the at least one user command is changed such that the at least one user command is inconsistent with the vehicle driving information, controlling the vehicle based on the vehicle driving information without the at least one user command; and based on receiving two or more user commands that are inconsistent with the vehicle driving information for a second time period, controlling the vehicle to perform a preset operation associated with the at least one user command.

* * * * *